US012810297B2

(12) United States Patent
Kumar et al.

(10) Patent No.: US 12,810,297 B2
(45) Date of Patent: Nov. 24, 2026

(54) MACHINE LEARNING BASED SYSTEMS AND METHODS FOR MAPPING FINANCIAL INFORMATION

(71) Applicant: HIGHRADIUS CORPORATION, Houston, TX (US)

(72) Inventors: Aishwarya Kumar, Hyderabad (IN); Debanwesh Bose, Hyderabad (IN); Vipul Jain, Hyderabad (IN); Rehan Ahmad, Hyderabad (IN); Rahul Reddy Gabbireddy, Hyderabad (IN)

(73) Assignee: HIGHRADIUS CORPORATION

( * ) Notice: Subject to any disclaimer, the term of this patent is extended or adjusted under 35 U.S.C. 154(b) by 61 days.

(21) Appl. No.: 18/398,224

(22) Filed: Dec. 28, 2023

(65) Prior Publication Data

US 2025/0217804 A1 Jul. 3, 2025

(51) Int. Cl.
*G06Q 20/40* (2012.01)
*G06Q 20/10* (2012.01)

(52) U.S. Cl.
CPC ....... *G06Q 20/4014* (2013.01); *G06Q 20/102* (2013.01)

(58) Field of Classification Search
None
See application file for complete search history.

(56) References Cited

U.S. PATENT DOCUMENTS 7,716,128 B2 * 5/2010 Diveley ............... G06Q 20/382 705/64
10,142,340 B2 * 11/2018 Castinado ........... H04L 63/0884
10,395,243 B1 * 8/2019 Johansson .............. G06Q 40/00
10,438,202 B2 * 10/2019 Neighman ......... G06Q 20/4012
10,878,403 B1 * 12/2020 Zapata-Petrov ..... G06Q 20/223
11,188,917 B2 * 11/2021 Saleh ..................... G06N 20/00
11,321,772 B2 * 5/2022 Amtrup .................. G06Q 40/03
11,556,907 B2 * 1/2023 Marcous ................ G06Q 20/10
(Continued)

FOREIGN PATENT DOCUMENTS

EP 4579566 A1 * 7/2025 ........... G06Q 20/102
GB 2615171 A * 8/2023 ........... G06Q 20/123
(Continued)

*Primary Examiner* — Ayal I. Sharon
(74) *Attorney, Agent, or Firm* — Jason C. Cameron

(57) ABSTRACT

A machine learning based computing method for determining unique identifiers associated with first users based on information associated with financial transactions, is disclosed. The machine learning based computing method includes steps of: receiving inputs from electronic devices of second users; extracting data including second information related to identifiers associated with the first users, from databases based on the inputs received from the electronic devices; mapping at least one of: first identifiers, second identifiers and third identifiers, associated with the first users, on the first information; determining the unique identifiers associated with the first users based on mapping of at least one of: the first identifiers, the second identifiers and the third identifiers, associated with the first users, on the first information; and providing an output of the determined unique identifiers associated with the first users, to the second users on a user interface associated with the electronic devices.

17 Claims, 8 Drawing Sheets

(56) References Cited

U.S. PATENT DOCUMENTS

| | | | | | |
|---|---|---|---|---|---|
| 11,797,589 | B2 * | 10/2023 | Thungala | G06F 16/335 | |
| 11,978,054 | B2 * | 5/2024 | Allbright | G06Q 20/4016 | |
| 12,014,372 | B2 * | 6/2024 | Zhu | G06Q 20/4016 | |
| 12,086,826 | B1 * | 9/2024 | Swett | G06Q 20/326 | |
| 12,229,622 | B1 * | 2/2025 | Welch | G06T 19/006 | |
| 2002/0082987 | A1 * | 6/2002 | Wilson | G06Q 10/10 | 705/39 |
| 2002/0152156 | A1 * | 10/2002 | Tyson-Quah | G06Q 20/10 | 705/38 |
| 2014/0006273 | A1 * | 1/2014 | Gopinath | G06Q 20/10 | 705/40 |
| 2018/0330381 | A1 * | 11/2018 | Williams | G06Q 20/34 | |
| 2019/0213822 | A1 * | 7/2019 | Jain | G06Q 20/4016 | |
| 2020/0374286 | A1 * | 11/2020 | Agarwal | G06V 40/20 | |
| 2021/0081920 | A1 * | 3/2021 | Spina | G06N 20/00 | |
| 2021/0133709 | A1 * | 5/2021 | Mishraky | G06Q 20/105 | |
| 2022/0164699 | A1 * | 5/2022 | Neupane | G06N 20/00 | |
| 2023/0153339 | A1 * | 5/2023 | Thungala | G06F 16/335 | 707/769 |
| 2024/0169331 | A1 * | 5/2024 | Kolchin | G06Q 20/027 | |
| 2024/0202687 | A1 * | 6/2024 | Kolchin | G06Q 20/3255 | |
| 2024/0257124 | A1 * | 8/2024 | Kolchin | G06N 20/00 | |
| 2024/0330895 | A1 * | 10/2024 | Jayaraman | G06Q 20/3827 | |
| 2024/0338935 | A1 * | 10/2024 | Pedone | G06V 10/20 | |
| 2025/0022048 | A1 * | 1/2025 | Henryson | G06V 30/18 | |
| 2025/0173727 | A1 * | 5/2025 | Kolchin | G06Q 20/027 | |
| 2025/0217385 | A1 * | 7/2025 | Kunwar | G06F 16/285 | |
| 2025/0307917 | A1 * | 10/2025 | Iyer | G06Q 40/03 | |

FOREIGN PATENT DOCUMENTS

| | | | | |
|---|---|---|---|---|
| WO | WO-2011133814 A2 * | 10/2011 | | G06Q 20/4016 |
| WO | WO-2016172541 A1 * | 10/2016 | | G06Q 20/1085 |

* cited by examiner

MACHINE LEARNING BASED SYSTEMS AND METHODS FOR MAPPING FINANCIAL INFORMATION

FIELD OF INVENTION

Embodiments of the present disclosure relate to machine learning based (ML-based) computing systems, and more particularly relates to a ML-based computing method and system for determining one or more unique identifiers associated with one or more first users based on mapping of one or more information associated with one or more financial transactions.

BACKGROUND

In the field of financial data processing, a notable challenge arises when seeking to establish connections between financial information, such as those between customers and payment information. This difficulty becomes pronounced, especially when customer names are either missing or unreliable in payment data.

In a current scenario, when a payment is received from a customer, the customer names are often missing from the payment information. Consequently, the customers need to be identified through alternative identifiers, including at least one of: Magnetic Ink Character Recognition (MICR) numbers, International Bank Account Numbers (IBAN), payer names, and the like. However, there are several challenges with the current approach, given below.

Lack of Unique Identifiers: An absence of a distinct and uniform customer name requires reliance on alternative identifiers. However, these identifiers, including at least one of: the MICR, the IBAN, the payer names, and the like, frequently lack the uniqueness required for unambiguous customer mapping. As a result, one or more customers may have similar or identical identifiers, adding complexity to the mapping process.

One-to-many and many-to-one relationships: A single identifier (e.g., the MICR, the IBAN, the payer name, and the like), can be linked to one or more distinct customers. Conversely, a single customer may possess one or more distinct identifiers, resulting in intricate one-to-many and many-to-one relationships.

Data Quality Issues: The quality of the payment data frequently suffers from at least one of: errors, typographical discrepancies, inconsistencies, and the like. These issues can introduce inaccuracies into the mapping process, potentially resulting in false associations or missed matches.

Ambiguity: The absence of a clear customer name introduces ambiguity into an identification process. When different customers have similar MICR or IBAN numbers, or when the payer names lack sufficient distinguishing context, accurately determining the correct customer for a given payment becomes challenging.

Manual Intervention: Considering the inherent complexity and the possibility of errors, manual intervention frequently becomes necessary to review and validate mapping results. This manual review process requires a significant investment of time and human resources.

Scalability: Scaling the mapping process to handle a substantial volume of payments and the customers may pose operational challenges. Conducting manual mapping under such circumstances may result in notable bottlenecks in accounts receivables departments.

Hence, there is a need for an improved machine learning based (ML-based) computing system and method for determining one or more unique identifiers associated with one or more first users based on mapping of one or more information associated with one or more financial transactions, in order to address the aforementioned issues.

SUMMARY

This summary is provided to introduce a selection of concepts, in a simple manner, which is further described in the detailed description of the disclosure. This summary is neither intended to identify key or essential inventive concepts of the subject matter nor to determine the scope of the disclosure.

In accordance with an embodiment of the present disclosure, a machine-learning based (ML-based) computing method for determining one or more unique identifiers associated with one or more first users based on one or more information associated with one or more financial transactions, is disclosed. The ML-based computing method comprises receiving, by one or more hardware processors, one or more inputs from one or more electronic devices of one or more second users. The one or more inputs comprise first information related to at least one of: one or more magnetic ink character recognition (MICR) numbers, one or more international bank account numbers (IBAN), and one or more identities associated with the one or more first users (for example, payer name or payer alias).

The ML-based computing method further comprises extracting, by the one or more hardware processors, one or more data comprising second information related to one or more identifiers associated with the one or more first users, from one or more databases based on the one or more inputs received from the one or more electronic devices of the one or more second users. The one or more identifiers associated with the one or more first users comprise at least one of: one or more first identifiers, one or more second identifiers and one or more third identifiers, associated with the one or more first users.

The ML-based computing method further comprises mapping, by the one or more hardware processors, at least one of: the one or more first identifiers, the one or more second identifiers and the one or more third identifiers, associated with the one or more first users, on the first information related to at least one of: the one or more magnetic ink character recognition (MICR) numbers, the one or more international bank account numbers (IBAN), and the one or more identities associated with the one or more first users (for example, payer name or payer alias), by a machine learning model.

The ML-based computing method further comprises determining, by the one or more hardware processors, the one or more unique identifiers associated with the one or more first users based on mapping of at least one of: the one or more first identifiers, the one or more second identifiers and the one or more third identifiers, associated with the one or more first users, on the first information related to at least one of: the one or more magnetic ink character recognition (MICR) numbers, the one or more international bank account numbers (IBAN), and the one or more identities associated with the one or more first users (for example, payer name or payer alias).

The ML-based computing method further comprises providing, by the one or more hardware processors, an output of the determined one or more unique identifiers associated with the one or more first users, to the one or more second users on a user interface associated with the one or more electronic devices.

In an embodiment, the one or more first users comprise at least one of: one or more customers, one or more organizations, one or more corporations, one or more parent companies, one or more subsidiaries, one or more joint ventures, one or more partnerships, one or more governmental bodies, one or more associations, and one or more legal entities. The one or more second users comprises at least one of: one or more data analysts, one or more business analysts, one or more cash analysts, one or more financial analysts, one or more collection analysts, one or more debt collectors, and one or more professionals associated with cash and collection management.

In another embodiment, the one or more first identifiers associated with the one or more first users comprise nil identifiers associated with the one or more first users, extracted from the one or more databases based on the one or more inputs received from the one or more electronic devices of the one or more second users. The one or more second identifiers associated with the one or more first users comprise a single identifier associated with the one or more first users, extracted from the one or more databases based on the one or more inputs received from the one or more electronic devices of the one or more second users. The one or more third identifiers associated with the one or more first users comprise two or more identifiers associated with the one or more first users, extracted from the one or more databases based on the one or more inputs received from the one or more electronic devices of the one or more second users.

In yet another embodiment, mapping, by the one or more hardware processors, at least one of: the one or more first identifiers, the one or more second identifiers and the one or more third identifiers, associated with the one or more first users, on the first information related to at least one of: the one or more magnetic ink character recognition (MICR) numbers, the one or more international bank account numbers (IBAN), and the one or more identities associated with the one or more first users (for example, payer name or payer alias), comprises: (a) mapping, by the one or more hardware processors, the one or more identifiers associated with the one or more first users by adapting the one or more second users when the one or more first identifiers associated with the one or more first users comprise the nil identifiers; (b) mapping, by the one or more hardware processors, the single identifier associated with the one or more first users on the first information related to at least one of: the one or more magnetic ink character recognition (MICR) numbers, the one or more international bank account numbers (IBAN), and the one or more identities associated with the one or more first users (for example, payer name or payer alias), to determine the one or more unique identifiers associated with the one or more first users; and (c) mapping, by the one or more hardware processors, the two or more identifiers associated with the one or more first users on the first information related to at least one of the one or more magnetic ink character recognition (MICR) numbers, the one or more international bank account numbers (IBAN), and the one or more identities associated with the one or more first users (for example, payer name or payer alias), by the machine learning model.

In yet another embodiment, the ML-based computing method further comprises training, by the one or more hardware processors, the machine learning model, by: (a) obtaining, by the one or more hardware processors, one or more labelled datasets from the one or more databases, wherein the one or more labelled datasets comprise at least one of: one or more first historical data associated with the one or more first users and one or more second historical data associated with one or more payments; (b) setting, by the one or more hardware processors, one or more hyperparameters comprising at least one of: a K-value hyperparameter and a distance metric hyperparameter to identify one or more K-nearest neighbors associated with the one or more labelled datasets; (c) segmenting, by the one or more hardware processors, the one or more labelled datasets into at least one of: one or more training datasets and one or more validation datasets, wherein the one or more training datasets comprise one or more third historical data associated with the one or more first users and one or more fourth historical data associated with the one or more payments, and wherein the one or more validation datasets comprise one or more fifth historical data associated with the one or more first users and one or more sixth historical data associated with the one or more payments; and (d) training, by the one or more hardware processors, the machine learning model to correlate one or more first feature vectors associated with the one or more fourth historical data, with the one or more third historical data associated with the one or more first users.

In an embodiment, the machine learning model is trained by: (a) computing, by the one or more hardware processors, one or more distances between one or more data points, wherein the machine learning model is configured to compute the one or more distances from each data point of the one or more data points to the one or more data points in the one or more training datasets, by the distance metric hyperparameter; (b) identifying, by the one or more hardware processors, the one or more K-nearest neighbors based on the one or more distances computed for each data point of the one or more data points in the one or more training datasets; and (c) upon identifying the one or more K-nearest neighbors, determining, by the one or more hardware processors, one or more classes for each data point of the one or more data points based on at least one of: a majority voting process and a weighted voting process.

The one or more classes recurrently determined among the one or more K-nearest neighbors, are assigned as the one or more classes determined for each data point of the one or more data points. The one or more classes are determined by assigning one or more weights to the one or more K-nearest neighbors based on the one or more distances.

In yet another embodiment, the ML-based computing method further comprises validating, by the one or more hardware processors, the machine learning model based on the one or more validation datasets. In an embodiment, validating the machine learning model comprises: (a) applying, by the one or more hardware processors, the trained machine learning model on the one or more validation datasets to determine the one or more classes for each data point of the one or more data points; and (b) determining, by the one or more hardware processors, whether the trained machine learning model correlates one or more second feature vectors associated with the one or more sixth historical data, with the one or more fifth historical data associated with the one or more first users.

In yet another embodiment, the ML-based computing method further comprises adjusting, by the one or more hardware processors, the one or more hyperparameters to fine-tune the machine learning model based on the one or more results of validation of the machine learning model.

In yet another embodiment, the ML-based computing method further comprises (a) receiving, by the one or more hardware processors, the one or more training data comprising at least one of: one more seventh historical data associated with the one or more first users and one or more eighth historical data associated with the one or more payments: (b) adding, by the one or more hardware processors, the one or more training data with the one or more training datasets to generate one or more updated training datasets; (c) re-training, by the one or more hardware processors, the machine learning model to correlate the one or more first feature vectors associated with the one or more fourth historical data, with the one or more third historical data associated with the one or more first users; and (d) executing, by the one or more hardware processors, the re-trained machine learning model in a user identifier mapping subsystem to determine the one or more unique identifiers associated with the one or more first users.

In one aspect, a machine learning based (ML-based) computing system for determining one or more unique identifiers associated with one or more first users based on mapping of one or more information associated with one or more financial transactions, is disclosed. The ML-based computing system includes one or more hardware processors and a memory coupled to the one or more hardware processors. The memory includes a plurality of subsystems in the form of programmable instructions executable by the one or more hardware processors.

The plurality of subsystems comprises a data receiving subsystem configured to receive one or more inputs from one or more electronic devices of one or more second users. The one or more inputs comprise first information related to at least one of: one or more magnetic ink character recognition (MICR) numbers, one or more international bank account numbers (IBAN), and one or more identities associated with the one or more first users (for example, payer name or payer alias).

The plurality of subsystems further comprises a data extraction subsystem configured to extract one or more data comprising second information related to one or more identifiers associated with the one or more first users, from one or more databases based on the one or more inputs received from the one or more electronic devices of the one or more second users. The one or more identifiers associated with the one or more first users comprise at least one of: one or more first identifiers, one or more second identifiers and one or more third identifiers, associated with the one or more first users.

The plurality of subsystems further comprises a user identifier mapping subsystem configured to: (a) map at least one of: the one or more first identifiers, the one or more second identifiers and the one or more third identifiers, associated with the one or more first users, on the first information related to at least one of: the one or more magnetic ink character recognition (MICR) numbers, the one or more international bank account numbers (IBAN), and the one or more identities associated with the one or more first users (for example, payer name or payer alias), by a machine learning model; and (b) determine the one or more unique identifiers associated with the one or more first users based on mapping of at least one of: the one or more first identifiers, the one or more second identifiers and the one or more third identifiers, associated with the one or more first users, on the first information related to at least one of: the one or more magnetic ink character recognition (MICR) numbers, the one or more international bank account numbers (IBAN), and the one or more identities associated with the one or more first users (for example, payer name or payer alias).

The plurality of subsystems further comprises an output subsystem configured to provide an output of the determined one or more unique identifiers associated with the one or more first users, to the one or more second users on a user interface associated with the one or more electronic devices.

In another aspect, a non-transitory computer-readable storage medium having instructions stored therein that, when executed by a hardware processor, causes the processor to perform method steps as described above.

To further clarify the advantages and features of the present disclosure, a more particular description of the disclosure will follow by reference to specific embodiments thereof, which are illustrated in the appended figures. It is to be appreciated that these figures depict only typical embodiments of the disclosure and are therefore not to be considered limiting in scope. The disclosure will be described and explained with additional specificity and detail with the appended figures.

BRIEF DESCRIPTION OF DRAWINGS

The disclosure will be described and explained with additional specificity and detail with the accompanying figures in which.

Figure 1:
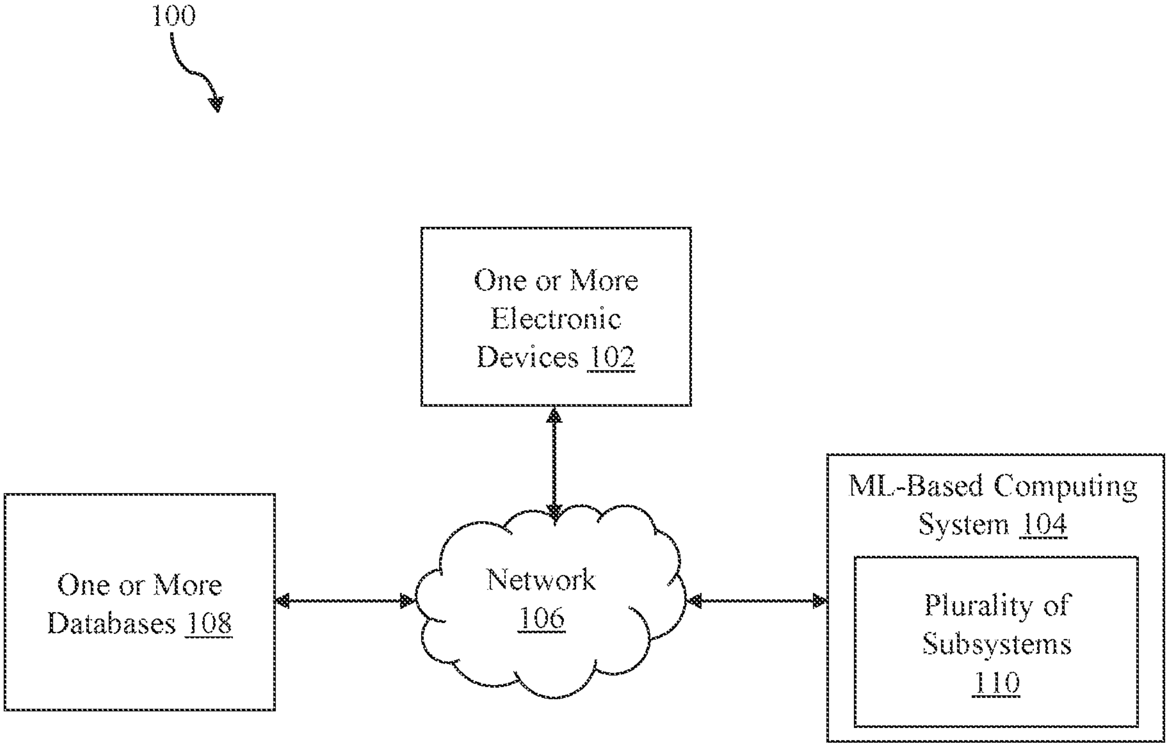
FIG. 1 is a block diagram illustrating a computing environment with a machine learning based (ML-based) computing system for determining one or more unique identifiers associated with one or more first users based on one or more information associated with one or more financial transactions, in accordance with an embodiment of the present disclosure.

Further, those skilled in the art will appreciate that elements in the figures are illustrated for simplicity and may not have necessarily been drawn to scale. Furthermore, in terms of the construction of the device, one or more components of the device may have been represented in the figures by conventional symbols, and the figures may show only those specific details that are pertinent to understanding the embodiments of the present disclosure so as not to obscure the figures with details that will be readily apparent to those skilled in the art having the benefit of the description herein.

DETAILED DESCRIPTION OF THE DISCLOSURE

For the purpose of promoting an understanding of the principles of the disclosure, reference will now be made to the embodiment illustrated in the figures and specific language will be used to describe them. It will nevertheless be understood that no limitation of the scope of the disclosure is thereby intended. Such alterations and further modifications in the illustrated system, and such further applications of the principles of the disclosure as would normally occur to those skilled in the art are to be construed as being within the scope of the present disclosure. It will be understood by those skilled in the art that the foregoing general description and the following detailed description are exemplary and explanatory of the disclosure and are not intended to be restrictive thereof.

In the present document, the word “exemplary” is used herein to mean “serving as an example, instance, or illustration.” Any embodiment or implementation of the present subject matter described herein as “exemplary” is not necessarily to be construed as preferred or advantageous over other embodiments.

The terms “comprise”, “comprising”, or any other variations thereof, are intended to cover a non-exclusive inclusion, such that one or more devices or sub-systems or elements or structures or components preceded by “comprises . . . a” does not, without more constraints, preclude the existence of other devices, sub-systems, additional sub-modules. Appearances of the phrase “in an embodiment”, “in another embodiment” and similar language throughout this specification may, but not necessarily do, all refer to the same embodiment.

Unless otherwise defined, all technical and scientific terms used herein have the same meaning as commonly understood by those skilled in the art to which this disclosure belongs. The system, methods, and examples provided herein are only illustrative and not intended to be limiting.

A computer system (standalone, client or server computer system) configured by an application may constitute a “module” (or “subsystem”) that is configured and operated to perform certain operations. In one embodiment, the “module” or “subsystem” may be implemented mechanically or electronically, so a module includes dedicated circuitry or logic that is permanently configured (within a special-purpose processor) to perform certain operations. In another embodiment, a “module” or “subsystem” may also comprise programmable logic or circuitry (as encompassed within a general-purpose processor or other programmable processor) that is temporarily configured by software to perform certain operations.

Accordingly, the term “module” or “subsystem” should be understood to encompass a tangible entity, be that an entity that is physically constructed, permanently configured (hardwired) or temporarily configured (programmed) to operate in a certain manner and/or to perform certain operations described herein.

Referring now to the drawings, and more particularly to FIG. 1 through FIG. 7, where similar reference characters denote corresponding features consistently throughout the figures, there are shown preferred embodiments and these embodiments are described in the context of the following exemplary system and/or method.

FIG. 1 is a block diagram illustrating a computing environment 100 with a machine learning based (ML-based) computing system 104 for determining one or more unique identifiers associated with one or more first users based on one or more information associated with one or more financial transactions, in accordance with an embodiment of the present disclosure. According to FIG. 1, the computing environment 100 includes one or more electronic devices 102 that are communicatively coupled to the ML-based computing system 104 through a network 106. The one or more electronic devices 102 through which one or more second users provide one or more inputs to the ML-based computing system 104.

In an embodiment, the one or more first users may include at least one of: one or more customers, one or more organizations, one or more corporations, one or more parent companies, one or more subsidiaries, one or more joint ventures, one or more partnerships, one or more governmental bodies, one or more associations, one or more legal entities, and the like. In an embodiment, the one or more second users may include at least one of: one or more data analysts, one or more business analysts, one or more cash analysts, one or more financial analysts, one or more collection analysts, one or more debt collectors, one or more professionals associated with cash and collection management, and the like.

The present invention is configured to provide determined one or more unique identifiers associated with the one or more first users, to the one or more second users through the one or more electronic devices 102. The ML-based computing system 104 is initially configured to receive one or more inputs from the one or more electronic devices 102 of one or more second users. In an embodiment, the one or more inputs include first information related to at least one of: one or more magnetic ink character recognition (MICR) numbers, one or more international bank account numbers (IBAN), one or more identities associated with the one or more first users (for example, payer name or payer alias), and the like.

The ML-based computing system 104 is further configured to extract one or more data including second information related to one or more identifiers associated with the one or more first users, from one or more databases 108 based on the one or more inputs received from the one or more electronic devices 102 of the one or more second users. In an embodiment, the one or more identifiers associated with the one or more first users include at least one of: one or more first identifiers, one or more second identifiers and one or more third identifiers, associated with the one or more first users.

The ML-based computing system 104 is further configured to map at least one of the one or more first identifiers, the one or more second identifiers and the one or more third identifiers, associated with the one or more first users, on the first information related to at least one of: the one or more magnetic ink character recognition (MICR) numbers, the one or more international bank account numbers (IBAN), and the one or more identities associated with the one or more first users (for example, payer name or payer alias), by a machine learning model.

The ML-based computing system 104 is further configured to determine the one or more unique identifiers associated with the one or more first users based on mapping of at least one of: the one or more first identifiers, the one or more second identifiers and the one or more third identifiers, associated with the one or more first users, on the first information related to at least one of: the one or more magnetic ink character recognition (MICR) numbers, the one or more international bank account numbers (IBAN), and the one or more identities associated with the one or more first users (for example, payer name or payer alias). The ML-based computing system 104 is further configured to provide an output of the determined one or more unique identifiers associated with the one or more first users, to the one or more second users on a user interface associated with the one or more electronic devices 102.

The ML-based computing system 104 may be hosted on a central server including at least one of: a cloud server or a remote server. Further, the network 106 may be at least one of: a Wireless-Fidelity (Wi-Fi) connection, a hotspot connection, a Bluetooth connection, a local area network (LAN), a wide area network (WAN), any other wireless network, and the like. In an embodiment, the one or more electronic devices 102 may include at least one of: a laptop computer, a desktop computer, a tablet computer, a Smartphone, a wearable device, a Smart watch, and the like.

Further, the computing environment 100 includes the one or more databases 108 communicatively coupled to the ML-based computing system 104 through the network 106. In an embodiment, the one or more databases 108 includes at least one of: one or more relational databases, one or more object-oriented databases, one or more data warehouses, one or more cloud-based databases, and the like. In another embodiment, a format of the one or more data generated from the one or more databases 108 may include at least one of: a comma-separated values (CSV) format, a JavaScript Object Notation (JSON) format, an Extensible Markup Language (XML), spreadsheets, and the like. Furthermore, the one or more electronic devices 102 include at least one of: a local browser, a mobile application, and the like.

Furthermore, the one or more second users may use a web application through the local browser, the mobile application to communicate with the ML-based computing system 104. In an embodiment of the present disclosure, the ML-based computing system 104 includes a plurality of subsystems 110. Details on the plurality of subsystems 110 have been elaborated in subsequent paragraphs of the present description with reference to FIG. 2.

Figure 2:
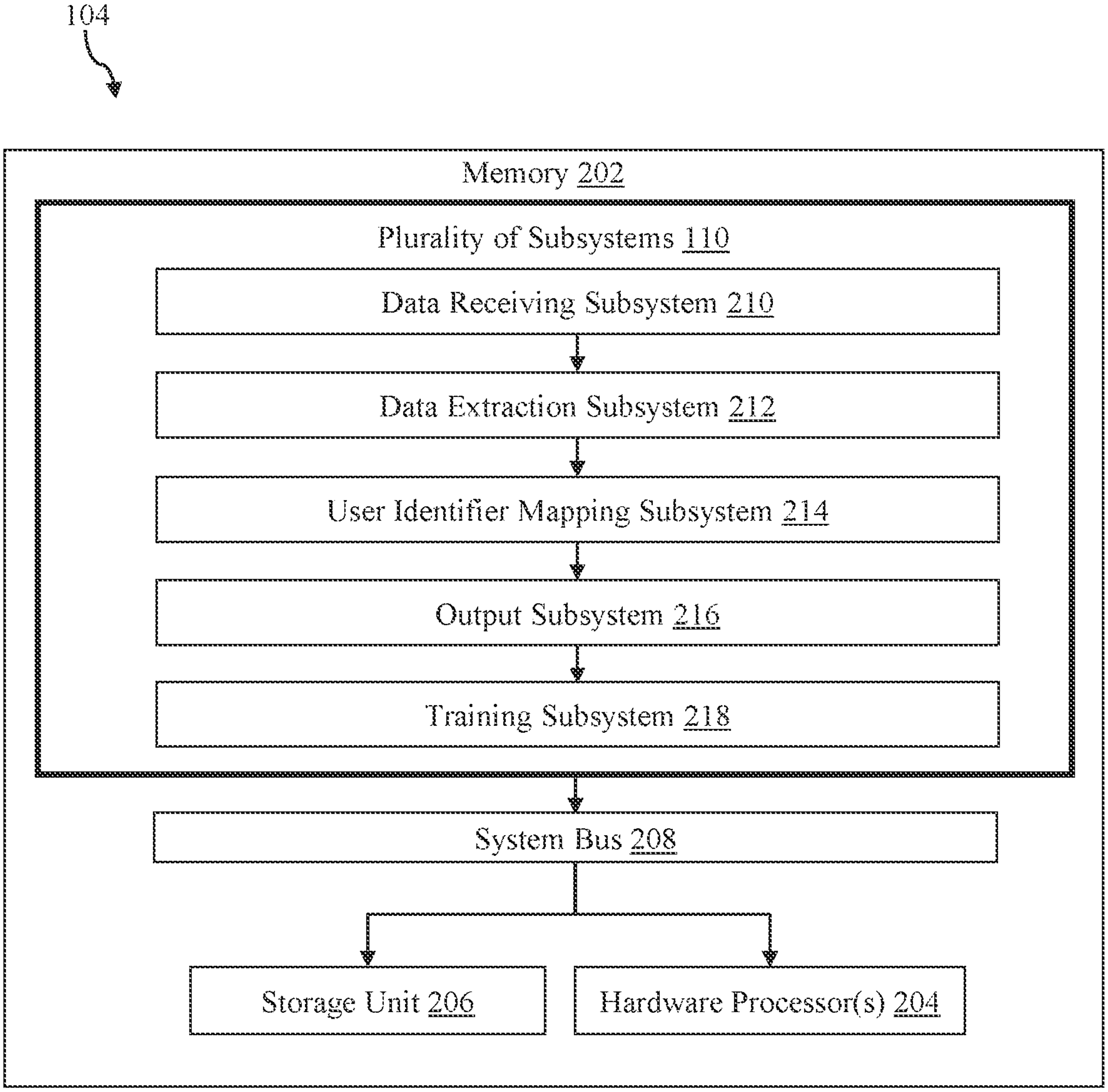
FIG. 2 is a detailed view of the ML-based computing system for determining the one or more unique identifiers associated with the one or more first users based on the one or more information associated with the one or more financial transactions, in accordance with another embodiment of the present disclosure.

FIG. 2 is a detailed view of the ML-based computing system 104 for determining the one or more unique identifiers associated with the one or more first users based on the one or more information associated with the one or more financial transactions, in accordance with another embodiment of the present disclosure. The ML-based computing system 104 includes a memory 202, one or more hardware processors 204, and a storage unit 206. The memory 202, the one or more hardware processors 204, and the storage unit 206 are communicatively coupled through a system bus 208 or any similar mechanism. The memory 202 includes the plurality of subsystems 110 in the form of programmable instructions executable by the one or more hardware processors 204.

The plurality of subsystems 110 includes a data receiving subsystem 210, a data extraction subsystem 212, a user identifier mapping subsystem 214, an output subsystem 216, and a training subsystem 218. The brief details of the plurality of subsystems 110 have been elaborated in a below table.

| Plurality of Subsystems 110 | Functionality |
|---|---|
| Data receiving subsystem 210 | The data receiving subsystem 210 is configured to receive the one or more inputs from the one or more electronic devices 102 of the one or more second users. The one or more inputs include the first information related to at least one of: the one or more magnetic ink character recognition (MICR) numbers, the one or more international bank account numbers (IBAN), and the one or more identities associated with the one or more first users (for example, payer name or payer alias). |
| Data extraction subsystem 212 | The data extraction subsystem 212 is configured to extract the one or more data including the second information related to the one or more identifiers associated with the one or more first users, from the one or more databases 108 based on the one or more inputs received from the one or more electronic devices 102 of the one or more second users. |
| User identifier mapping subsystem 214 | The user identifier mapping subsystem 214 is configured to map at least one of the one or more first identifiers, the one or more second identifiers and the one or more third identifiers, associated with the one or more first users, on the first information related to at least one of: the one or more magnetic ink character recognition (MICR) numbers, the one or more international bank account numbers (IBAN), and the one or more identities associated with the one or more first users (for example, payer name or payer alias), by the machine learning model.<br>The user identifier mapping subsystem 214 is further configured to determine the one or more unique identifiers associated with the one or more first users based on mapping of at least one of: the one or more first identifiers, the one or more second identifiers and the one or more third identifiers, associated with the one or more first users, on the first information related to at least one of: the one or more magnetic ink character recognition (MICR) numbers, the one or more international bank account numbers (IBAN), and the one or more identities associated with the one or more first users (for example, payer name or payer alias). |
| Output Subsystem 216 | The output subsystem 216 is configured to provide the output of the determined one or more unique identifiers associated |

-continued

| Plurality of Subsystems 110 | Functionality |
|---|---|
| | with the one or more first users, to the one or more second users on a user interface associated with the one or more electronic devices 102. |
| Training Subsystem 218 | The training subsystem 218 is configured to re-train the machine learning model over a plurality of time intervals with one or more training data. |

The one or more hardware processors 204, as used herein, means any type of computational circuit, including, but not limited to, at least one of: a microprocessor unit, microcontroller, complex instruction set computing microprocessor unit, reduced instruction set computing microprocessor unit, very long instruction word microprocessor unit, explicitly parallel instruction computing microprocessor unit, graphics processing unit, digital signal processing unit, or any other type of processing circuit. The one or more hardware processors 204 may also include embedded controllers, including at least one of: generic or programmable logic devices or arrays, application specific integrated circuits, single-chip computers, and the like.

The memory 202 may be non-transitory volatile memory and non-volatile memory. The memory 202 may be coupled for communication with the one or more hardware processors 204, being a computer-readable storage medium. The one or more hardware processors 204 may execute machine-readable instructions and/or source code stored in the memory 202. A variety of machine-readable instructions may be stored in and accessed from the memory 202. The memory 202 may include any suitable elements for storing data and machine-readable instructions, including at least one of: read only memory, random access memory, erasable programmable read only memory, electrically erasable programmable read only memory, a hard drive, a removable media drive for handling compact disks, digital video disks, diskettes, magnetic tape cartridges, memory cards, and the like. In the present embodiment, the memory 202 includes the plurality of subsystems 110 stored in the form of machine-readable instructions on any of the above-mentioned storage media and may be in communication with and executed by the one or more hardware processors 204.

The storage unit 206 may be a cloud storage, a Structured Query Language (SQL) data store, a noSQL database or a location on a file system directly accessible by the plurality of subsystems 110.

The plurality of subsystems 110 includes the data receiving subsystem 210 that is communicatively connected to the one or more hardware processors 204. The data receiving subsystem 210 is configured to receive the one or more inputs from the one or more electronic devices 102 of the one or more second users. In an embodiment, the one or more inputs include the first information related to at least one of: the one or more magnetic ink character recognition (MICR) numbers, the one or more international bank account numbers (IBAN), the one or more identities associated with the one or more first users (for example, payer name or payer alias), and the like.

In an embodiment, the one or more magnetic ink character recognition (MICR) numbers employ magnetic ink and are uniquely encoded with specific numbers and characters. The one or more magnetic ink character recognition (MICR) numbers may include one or more vital information having bank's routing number and individual account number. The one or more magnetic ink character recognition (MICR) numbers may be located at the bottom of one or more financial instruments/devices including one or more cheques.

In an embodiment, the standardized format of the one or more international bank account numbers (IBAN) is designed for an international identification of bank accounts. The one or more international bank account numbers (IBAN) includes a combination of a country code, a verification digit, and the account number. The primary objective of the one or more international bank account numbers (IBAN) is to streamline cross-border financial transactions, guaranteeing an accurate routing of funds to an intended recipient's account. In an embodiment, the one or more identities associated with the one or more first users (e.g., payer alias or alternate payer name) indicate an alternative identifier that can be used by the one or more first users (e.g., customers or entities). The one or more identities associated with the one or more first users may be in the form of at least one of: a nickname, a designated code, and any other distinct label that individuals or organizations selected to represent their account or identity without necessarily disclosing their legal name.

The plurality of subsystems 110 includes the data extraction subsystem 212 that is communicatively connected to the one or more hardware processors 204. The data extraction subsystem 212 is configured to extract the one or more data including the second information related to the one or more identifiers (e.g., customer information) associated with the one or more first users, from the one or more databases 108 based on the one or more inputs received from the one or more electronic devices 102 of the one or more second users. In other words, the data extraction subsystem 212 is configured to search and return the one or more identifiers (e.g., customer name or customer number) associated with at least one of: the one or more magnetic ink character recognition (MICR) numbers (the routing number), the one or more international bank account numbers (IBAN), and the one or more payer alias (the payer name).

The one or more magnetic ink character recognition (MICR) numbers are configured to serve as a unique code typically found on bank cheques, enabling an identification of specific accounts. The one or more international bank account numbers (IBAN) are internationally recognized formats used to uniquely identify bank accounts. The one or more payer names provide a customizable identifier or alias associated with the one or more first users (e.g., customers) within the system. In one embodiment, in terms of database mapping, each MICR Number, IBAN Number, or payer name can be associated either with one or more first identifiers, one or more second identifiers, and one or more third identifiers, in the one or more databases 108.

The one or more first identifiers may include nil identifiers associated with the one or more first users, extracted from the one or more databases 108 based on the one or more inputs received from the one or more electronic devices 102 of the one or more second users. The one or more second identifiers may include a single identifier associated with the one or more first users, extracted from the one or more databases 108 based on the one or more inputs received from the one or more electronic devices 102 of the one or more second users. The one or more third identifiers may include two or more identifiers associated with the one or more first users, extracted from the one or more databases 108 based on the one or more inputs received from the one or more electronic devices 102 of the one or more second users.

In one embodiment, the primary functionality of the data extraction subsystem 212 revolves around its search capabilities. Based on the one or more inputs of at least one of: the one or more magnetic ink character recognition (MICR) numbers, the one or more international bank account numbers (IBAN), and the one or more identities associated with the one or more first users (e.g., the payer name or payer alias), the data extraction subsystem 212 is configured to initiate a database search operation. This database search aims to identify the one or more identifiers to whom the provided inputs are associated.

In a non-limiting example, a MICR Number "123456" is received at the data receiving subsystem 210. The data extraction subsystem 212 is configured to perform a search within the one or more databases 108 and to output a list of customer names associated with this MICR Number, including "Customer A," "Customer B." and "Customer C." This indicates that the MICR Number "123456" is linked to these three customers within the one or more databases 108. Similar principles apply when searching with an IBAN Number and the payer alias, as the data extraction subsystem 212 is configured to extract all customers linked to the provided input, delivering a comprehensive and informative output.

In another non-limiting example, an IBAN number "DE89370400440532013000" is received at the data receiving subsystem 210. The data extraction subsystem 212 is configured to perform a search within the one or more databases 108 and to output a list of customer names associated with this IBAN Number, including "ABC Corp," "DEF Corp," and "XYZ Corp". This output signifies that the IBAN Number "DE89370400440532013000" corresponds to these three customers within the one or more databases 108. In another non-limiting example, a Payer Alias "VIP-Customer" is received at the data receiving subsystem 210. Subsequently, the data extraction subsystem 212 is configured to perform a search within the one or more databases 108 to identify all customers linked to this particular Payer Alias. The output produced by the data extraction subsystem 212 could include customer names including "VIP Client A," "VIP Client B," and "Preferred Customer XYZ".

In an embodiment, the one or more data extracted by the data extraction subsystem 212 is encapsulated within a data object, which may be represented in one or more formats, including but not limited to Lists or Arrays, JavaScript Object Notation (JSON), extensible Markup Language (XML), Comma-Separated Values (CSV), Custom Data Structures, and even as a Database Query Result.

The plurality of subsystems 110 includes the user identifier mapping subsystem 214 that is communicatively connected to the one or more hardware processors 204. The user identifier mapping subsystem 214 is configured to adapt the one or more second users to manually map the one or more identifiers associated with the one or more first users on the first information related to at least one of: the one or more magnetic ink character recognition (MICR) numbers, the one or more international bank account numbers (IBAN), and the one or more identities (e.g., the payer alias or the payer name) associated with the one or more first users, when the nil identifiers is extracted from the one or more databases 108 based on the one or more inputs received from the one or more electronic devices 102 of the one or more second users.

The user identifier mapping subsystem 214 is further configured to map the single identifier associated with the one or more first users on the first information related to at least one of: the one or more magnetic ink character recognition (MICR) numbers, the one or more international bank account numbers (IBAN), and the one or more identities associated with the one or more first users (for example, payer name or payer alias), to determine the one or more unique identifiers associated with the one or more first users. The determined one or more unique identifiers are provided as the output to the one or more second users through the user interface of the one or more electronic devices 102.

The user identifier mapping subsystem 214 is further configured to map the two or more identifiers associated with the one or more first users on the first information related to at least one of: the one or more magnetic ink character recognition (MICR) numbers, the one or more international bank account numbers (IBAN), and the one or more identities associated with the one or more first users (for example, payer name or payer alias), by the machine learning model.

The user identifier mapping subsystem 214 is configured to receive the data object from the data extraction subsystem 212. In an example embodiment, if the data object includes one or more customers mapped to at least one of: a single MICR, IBAN and payer alias, the user identifier mapping subsystem 214 is configured to map a single customer to the corresponding MICR, IBAN and payer alias based on the machine learning model. In an embodiment, the machine learning model (e.g., a clustering based machine learning model) may include at least one of: a Density-Based Spatial Clustering of Applications with Noise (DBSCAN) model, a K-nearest neighbors (KNN) model, a K-means model, and the like. In another embodiment, the machine learning model is a fine-tuned KNN machine learning model. In an embodiment, the fine-tuned KNN machine learning model is trained using one or more labelled datasets including one or more first historical data associated with the one or more first users (e.g., customer data) and one or more second historical data associated with one or more payments (e.g., historical payment data). The method of training the machine learning model (e.g., the KNN based machine learning model) is further elaborated in subsequent paragraphs of the present description with reference to FIG. 4.

In certain embodiments, the one or more first historical data associated with the one or more first users (e.g., customer data) may include at least one of: one or more identifiers associated with the one or more first users (e.g., customer identifier), MICR identifier, IBAN identifier, payer alias, and the like. In certain embodiments, the one or more second historical data associated with one or more payments (e.g., historical payment data) may include at least one of: payment pool identifier, payment bank identifier, payment day of the week, payment method, payment bundling information, payment currency, payment amount, payment count, payment header identifier, and the like.

In certain embodiments, the fine-tuned KNN model is a clustering based machine learning model to dynamically map the one or more identifiers associated with the one or more first users (e.g., customer identifier) with the corresponding MICR, IBAN and Payer alias. The most probable customer identifier is returned by the machine learning model as the mapped information. In an embodiment, the mapping of customer identifiers with the MICR, IBAN and payer alias, is not a static activity. Specifically, the systems and methods are configured to monitor new data from the one or more databases 108 or information sources described herein to upgrade the machine learning model as it evolves through one or more time periods.

The plurality of subsystems 110 includes the output subsystem 216 that is communicatively connected to the one or more hardware processors 204. The output subsystem 216 is configured to provide the output of the determined one or more unique identifiers associated with the one or more first users, to the one or more second users on the user interface associated with the one or more electronic devices 102. In an embodiment, the output subsystem 216 is further configured to update one or more database records related to mapped one or more unique identifiers associated with the one or more first users corresponding to at least one of: the one or more magnetic ink character recognition (MICR) numbers, the one or more international bank account numbers (IBAN), and the one or more identities associated with the one or more first users (e.g., the payer alias or the payer name).

The plurality of subsystems 110 includes the training subsystem 218 that is communicatively connected to the one or more hardware processors 204. The training subsystem 218 is configured to re-train the machine learning model over a plurality of time intervals based on one or more training data. For re-training the machine learning model over the plurality of time intervals, the training subsystem 218 is configured to receive the one or more training data including at least one of: one more seventh historical data associated with the one or more first users (e.g., new data associated with the one or more first users) and one or more eighth historical data associated with the one or more payments (e.g., one or more historical payment data). The training subsystem 218 is further configured to add the one or more training data with the one or more training datasets to generate one or more updated training datasets that include both old data points and new data points.

The training subsystem 218 is further configured to re-train the machine learning model to correlate the one or more first feature vectors associated with one or more fourth historical data (e.g., one or more historical payment data of one or more training datasets), with one or more third historical data (e.g., one or more customer data of the one or more training datasets) associated with the one or more first users. The training subsystem 218 is further configured to execute the re-trained machine learning model in the user identifier mapping subsystem 214 to determine the one or more unique identifiers associated with the one or more first users.

Subsequently, the same training process is followed which includes continuous evaluation and tuning to assess the quality of the mappings and iteratively improving the results if necessary. The steps are repeated for a fixed number of iterations until newly added MICR, IBAN and payer alias are appropriately mapped to customer identifier as per a pre-set threshold criteria.

Figure 3:
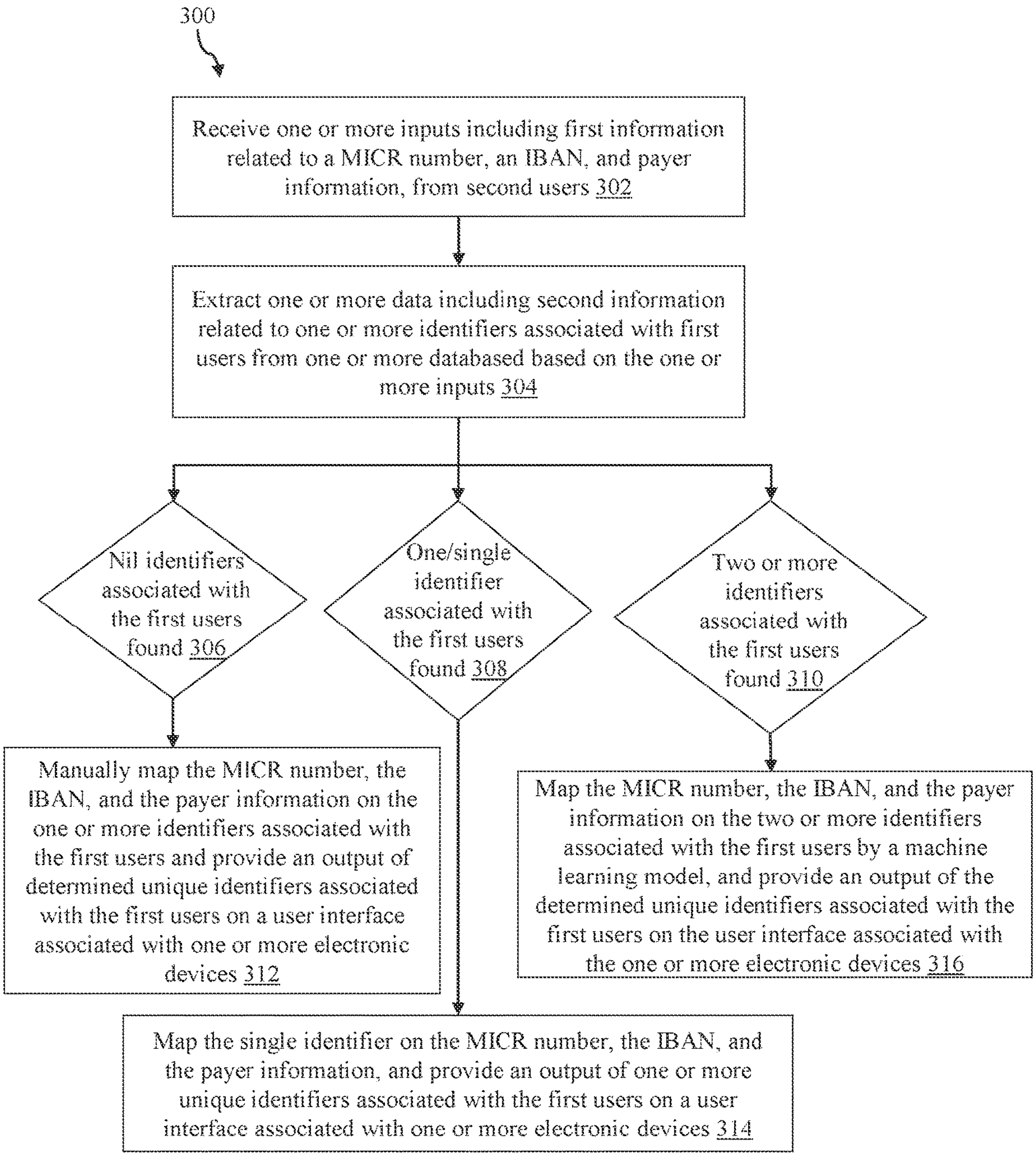
FIG. 3 is a process flow of mapping one or more identifiers associated with the one or more first users to payment information in financial databases, in accordance with another embodiment of the present disclosure.

FIG. 3 is a process flow 300 of mapping the one or more identifiers associated with the one or more first users to the payment information in financial databases, in accordance with another embodiment of the present disclosure. At step 302, the one or more inputs are received from the one or more electronic devices 102 of the one or more second users. In an embodiment, the one or more inputs include the first information related to at least one of: the one or more magnetic ink character recognition (MICR) numbers, the one or more international bank account numbers (IBAN), and the one or more identities associated with the one or more first users (for example, payer name or payer alias).

At step 304, the one or more data including the second information related to the one or more identifiers associated with the one or more first users, are extracted from the one or more databases 108 based on the one or more inputs received from the one or more electronic devices 102 of the one or more second users. In an embodiment, the one or more identifiers associated with the one or more first users include at least one of: the one or more first identifiers, the one or more second identifiers and the one or more third identifiers, associated with the one or more first users.

The one or more first identifiers associated with the one or more first users include the nil identifiers associated with the one or more first users. The nil identifiers are extracted from the one or more databases 108 based on the one or more inputs received from the one or more electronic devices 102 of the one or more second users, as shown in step 306. This means that the first users may not have any identifiers or the identifiers are not identified. The one or more second identifiers associated with the one or more first users include the single identifier associated with the one or more first users. The single identifier is extracted from the one or more databases 108 based on the one or more inputs received from the one or more electronic devices 102 of the one or more second users, as shown in step 308. The one or more second identifiers associated with the one or more first users include the two or more identifiers associated with the one or more first users. The two or more identifiers are extracted from the one or more databases 108 based on the one or more inputs received from the one or more electronic devices 102 of the one or more second users, as shown in step 310.

The user identifier mapping subsystem 214 is configured to adapt the one or more second users to manually map the one or more identifiers associated with the one or more first users (e.g., the customers) on the first information related to at least one of: the one or more magnetic ink character recognition (MICR) numbers, the one or more international bank account numbers (IBAN), and the one or more identities associated with the one or more first users, to determine the one or more unique identifiers associated with the one or more first users and provide an output of the determined unique identifiers associated with the first users on the user interface associated with the one or more electronic devices 102, as shown in step 312. In an embodiment, the ML-based computing system 104 provides the user interface of the one or more electronic devices 102 through which the one or more second users are adapted to map the one or more identifiers associated with the one or more first users (e.g., the customers) on the first information related to at least one of: the one or more magnetic ink character recognition (MICR) numbers, the one or more international bank account numbers (IBAN), and the one or more identities associated with the one or more first users.

The user identifier mapping subsystem 214 is configured to map the single identifier associated with the one or more first users on the first information related to at least one of: the one or more magnetic ink character recognition (MICR) numbers, the one or more international bank account numbers (IBAN), and the one or more identities associated with the one or more first users, and to provide the output of the single identifier as the unique identifier associated with the one or more first users on the user interface associated with the one or more electronic devices 102, as shown in step 314.

The user identifier mapping subsystem 214 is configured to map the two or more identifiers associated with the one or more first users on the first information related to at least one of: the one or more magnetic ink character recognition (MICR) numbers, the one or more international bank account numbers (IBAN), and the one or more identities associated with the one or more first users, to determine the one or more unique identifiers associated with the one or more first users and provide an output of the determined unique identifiers associated with the first users on the user interface associated with the one or more electronic devices 102, as shown in step 316.

Figure 4:
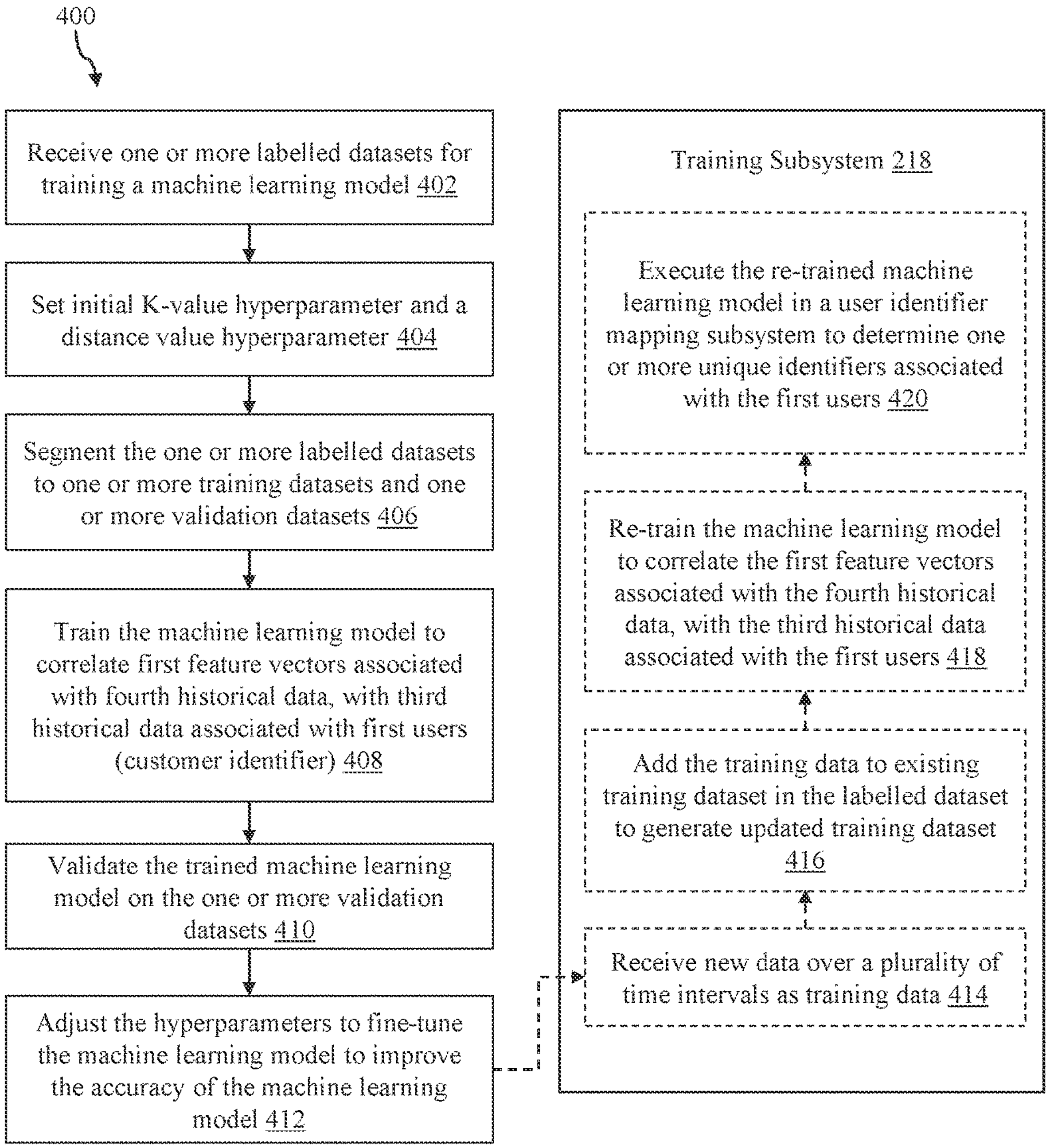
FIG. 4 is a process flow of training a machine learning model for mapping the one or more identifiers associated with the one or more first users to the payment information in financial databases, in accordance with an embodiment of the present disclosure.

FIG. 4 is a process flow 400 of training the machine learning model for mapping the one or more identifiers associated with the one or more first users to the payment information in financial databases, in accordance with an embodiment of the present disclosure. The payment information is the first information related to at least one of: the one or more magnetic ink character recognition (MICR) numbers, the one or more international bank account numbers (IBAN), and the one or more identities associated with the one or more first users.

In an embodiment, the machine learning model is optimized for clustering. In certain embodiments, the machine learning model may include at least one of: the KNN model, the K-Means model, a Hierarchical Clustering model, the DBSCAN model, a Gaussian Mixture Model (GMM), an Agglomerative Clustering model, a Mean Shift Clustering model, an Ordering Points To Identify the Clustering Structure (OPTICS) model, a Spectral Clustering model, a Self-Organizing Maps (SOM) model, a balanced iterative reducing and clustering using hierarchies (BIRCH) model, and the like.

At step 402, the process flow 400 starts with preparation of the one or more labelled datasets which are used for training the machine learning model. In other words, the one or more labelled datasets are obtained from the one or more databases 108, as shown in step 402. In an embodiment, the one or more labelled datasets include at least one of: the one or more first historical data (e.g., the customer data) associated with the one or more first users and the one or more second historical data (e.g., historical payment data) associated with the one or more payments.

In an embodiment, the customer data may include at least one of: one or more identifiers associated with the one or more users (e.g., the customers), the one or more magnetic ink character recognition (MICR) numbers, the one or more international bank account numbers (IBAN), the one or more identities associated with the one or more first users, and the like. In an embodiment, the historical payment data may include at least one of: the payment pool identifier, the payment bank identifier, the payment day of the week, the payment method, the payment bundling information, the payment currency, the payment amount, the payment count, the payment header identifier, and the like.

In an embodiment, the one or more identifiers (e.g., customer names) associated with the one or more users (e.g., the customers) indicate at least one of: an entity, organization, corporation, partnership, governmental body, association, a legal person from whom a payment is received, and the like. The customer names may also indicate an individual. In another embodiment, the one or more magnetic ink character recognition (MICR) numbers employ the magnetic ink and are uniquely encoded with the specific numbers and the characters. The one or more magnetic ink character recognition (MICR) numbers may include the one or more vital information having the bank's routing number and the individual account number. The one or more magnetic ink character recognition (MICR) numbers may be located at the bottom of the one or more financial instruments/devices including the one or more cheques.

In another embodiment, the standardized format of the one or more international bank account numbers (IBAN) is designed for an international identification of bank accounts. The one or more international bank account numbers (IBAN) includes the combination of the country code, the verification digit, and the account number. The primary objective of the one or more international bank account numbers (IBAN) is to streamline the cross-border financial transactions, guaranteeing the accurate routing of funds to the intended recipient's account. In another embodiment, the one or more identities associated with the one or more first users (e.g., the payer alias or the alternate payer name) indicate the alternative identifier that can be used by the one or more first users (e.g., the customers or the entities). The one or more identities associated with the one or more first users may be in the form of at least one of: the nickname, the designated code, and any other distinct label that the individuals or the organizations selected to represent their account or identity without necessarily disclosing their legal name.

In another embodiment, the payment pool identifier is configured to serve as a classification mechanism for segregating payments into different pools within a financial system based on timing or batch in which they are loaded. The payment pool identifier is instrumental in streamlining payment processing and optimizing resource allocation within financial institutions. The payments are assigned distinct pool identifiers, allowing for efficient management and prioritization of payment processing workflows. In another embodiment, the payment bank identifier is configured to identify a specific financial institution through which a payment transaction was initiated. The payment bank identifier is crucial for routing and settlement purposes, as the payment bank identifier ensures that funds are correctly directed to an appropriate bank or financial entity. The payment bank identifier typically includes a unique code or identifier associated with the bank, facilitating accurate identification and verification of payment origins.

In another embodiment, the payment day of the week indicates the day of the week on which a payment transaction was initiated or processed. In another embodiment, the payment method indicates the manner in which a payment is made, encompassing one or more forms including at least one of: cheques, electronic funds transfers (EFT), wire transfers, and the like. Each payment method carries its unique set of requirements and processing protocols. In another embodiment, the payment bundling identifier is a critical component of payment aggregation and consolidation. The payment bundling identifier is used to group one or more individual payments into a single batch or bundle, often for more efficient processing or reporting purposes.

In another embodiment, the payment currency represents a specific monetary unit in which a payment is made. The payment currency is essential for accurate accounting and conversion processes, particularly in international transactions where one or more currencies may be involved. In another embodiment, the payment amount represents a value or monetary sum associated with a payment transaction. In another embodiment, the payment count indicates a number of individual payments included in a given transaction or batch. In another embodiment, the payment header identifier is a unique code or reference number associated with a payment header. The payment header identifier typically includes important information about a batch of payments, and the payment header identifier helps in distinguishing one batch from another.

In another embodiment, one or more feature vectors and one or more target variables are separately labelled in the one or more labelled datasets. In an embodiment, the one or more feature vectors include at least one of: the one or more magnetic ink character recognition (MICR) numbers, the one or more international bank account numbers (IBAN), and the one or more identities (e.g., the payer alias) associated with the one or more first users, the payment pool identifier, the payment bank identifier, the payment day of the week, the payment method, the payment bundling information, the payment currency, the payment amount, the payment count, the payment header identifier, and the like. In another embodiment, the one or more target variables are the one or more identifiers (e.g., the customer identifier) associated with the one or more users. In certain embodiments, the customer identifier includes at least one of: the customer name, the customer number, and the like.

In an embodiment, for the preparation of a labelled dataset, the step 402 includes retrieving the one or more historical data including one or more unlabelled data elements. Thereafter, the one or more customer data and the one or more historical payment data are arranged in a dataset for the one or more labelled datasets. The one or more labelled datasets may be employed for training and evaluating the machine learning model (e.g., the KNN based machine learning model). In another embodiment, the one or more labelled datasets are stored in a database or the one or more databases 108.

The database or the one or more databases 108 may include at least one of: the relational databases, the object-oriented databases, the data warehouses, the cloud-based databases, and the like. In an embodiment, a format of the data generated from the one or more databases 108 may include at least one of the comma-separated values (CSV) format, the JavaScript Object Notation (JSON) format, the Extensible Markup Language (XML), spreadsheets, and the like.

At step 404, one or more hyperparameters including at least one of: a K-value hyperparameter and a distance metric hyperparameter are set to identify one or more K-nearest neighbors to consider when making a prediction for a new data point. In an embodiment, the distance metric hyperparameter is configured to determine how the machine learning model (e.g., the KNN based machine learning model model) calculates a distance between one or more data points to identify the one or more K-nearest neighbors. In certain embodiments, the default initial K-value hyperparameter for the machine learning model is 3. In an embodiment, the distance metric hyperparameter may include at least one of: Euclidean Distance, Manhattan Distance, Minkowski Distance, Cosine Similarity, Hamming Distance, Custom Distance Metrics, and the like.

At step 406, the one or more labelled datasets are split/segmented into at least one of: one or more training datasets and one or more validation datasets. In a non-limiting embodiment, a 70-30 split is used for training and validation, respectively. In another non-limiting embodiment, a 80-20 split is used for training and validation, respectively. In an embodiment, the one or more training datasets may include one or more third historical data associated with the one or more first users and one or more fourth historical data associated with the one or more payments. In another embodiment, the one or more validation datasets may include one or more fifth historical data associated with the one or more first users and one or more sixth historical data associated with the one or more payments.

At step 408, the machine learning model is trained to correlate one or more feature vectors (e.g., one or more first feature vectors) associated with the one or more fourth historical data, with one or more target variables related to the one or more third historical data (e.g., the customer identifier) associated with the one or more first users, based on the one or more training datasets. For training the machine learning model, the training subsystem 218 is configured to compute one or more distances between the one or more data points. In an embodiment, the one or more distances are computed from each data point of the one or more data points to the one or more data points in the one or more training datasets, by the distance metric hyperparameter.

The training subsystem 218 is further configured to identify the one or more K-nearest neighbors based on the one or more distances computed for each data point of the one or more data points in the one or more training datasets. Upon identifying the one or more K-nearest neighbors, the training subsystem 218 is further configured to determine one or more classes for each data point of the one or more data points based on at least one of: a majority voting process and a weighted voting process. In an embodiment, the one or more classes are selected from mapping of at least one of: the one or more magnetic ink character recognition (MICR) numbers, the one or more international bank account numbers (IBAN), and the one or more identities (e.g., the payer alias or the payer name) associated with the one or more first users.

In certain embodiments, the machine learning model is configured to utilize the majority voting process to determine the one or more classes. In this case, the one or more classes that appear most frequently among the one or more K-nearest neighbors is assigned as the predicted class for the current data point. In other embodiments, the machine learning model is configured to utilize the weighted voting process to determine the one or more classes. In this case, one or more weights are assigned to the one or more K-nearest neighbors based on their distance. In an embodiment, closer neighbors may have a higher influence on the prediction.

In an embodiment, the machine learning model is configured to repeat the process of identifying the one or more K-nearest neighbors and making predictions for all data points in the one or more training datasets. This process continues until all data points are classified into the one or more classes. Once the machine learning model has processed all data points in the one or more training datasets, the machine learning model has learned the relationships between the customer name and customer data and historical payment data.

At step 410, the trained machine learning model is validated based on the one or more validation datasets. The one or more validation datasets mirror the real-world. The training subsystem 218 is configured to apply the trained machine learning model on the one or more validation datasets to determine the one or more classes for each data point of the one or more data points. Further, the training subsystem 218 is further configured to determine the ability of the machine learning model to map new payment data (e.g., one or more second feature vectors associated with one or more sixth historical data) to customer identifier (e.g., one or more fifth historical data associated with the one or more first users). In other words, the training subsystem 218 is configured to correlate the one or more second feature vectors associated with the one or more sixth historical data, with the one or more fifth historical data associated with the one or more first users.

In one embodiment, the validation step may optionally require computation of performance metrics including accuracy, precision, recall, F1-score, receiver operating characteristic (ROC) curve, and an area under the ROC Curve (AUC) to compute predictions of the machine learning model against the actual labels. In certain embodiments, the accuracy score of the machine learning model is determined by computing the correct number of mappings divided by the total number of mappings performed by the machine learning model. This computation process serves to gauge how effectively the machine learning model generalizes to unseen data, offering insights into its strengths and potential weaknesses, including overfitting or underfitting.

At step 412, the one or more hyperparameters are adjusted to fine-tune the machine learning model and to improve the accuracy of the machine learning model, based on the one or more results of validation of the machine learning model. In an embodiment, the one or more hyperparameters underwent fine-tuning using at least one of: grid search, optimizing parameters including a number of trees and maximum tree depth. The one or more selected hyperparameters balanced model performance and overfitting.

At step 414, the one or more training data (e.g., new training data) including at least one of: one more seventh historical data associated with the one or more first users and one or more eighth historical data associated with the one or more payments, are received. At step 416, the one or more training data are added with the one or more training datasets to generate one or more updated training datasets. At step 418, the machine learning model is re-trained to correlate the one or more first feature vectors associated with the one or more fourth historical data, with the one or more third historical data associated with the one or more first users. At step 420, the re-trained machine learning model is executed in the user identifier mapping subsystem 214 to determine the one or more unique identifiers associated with the one or more first users.

Figure 5:
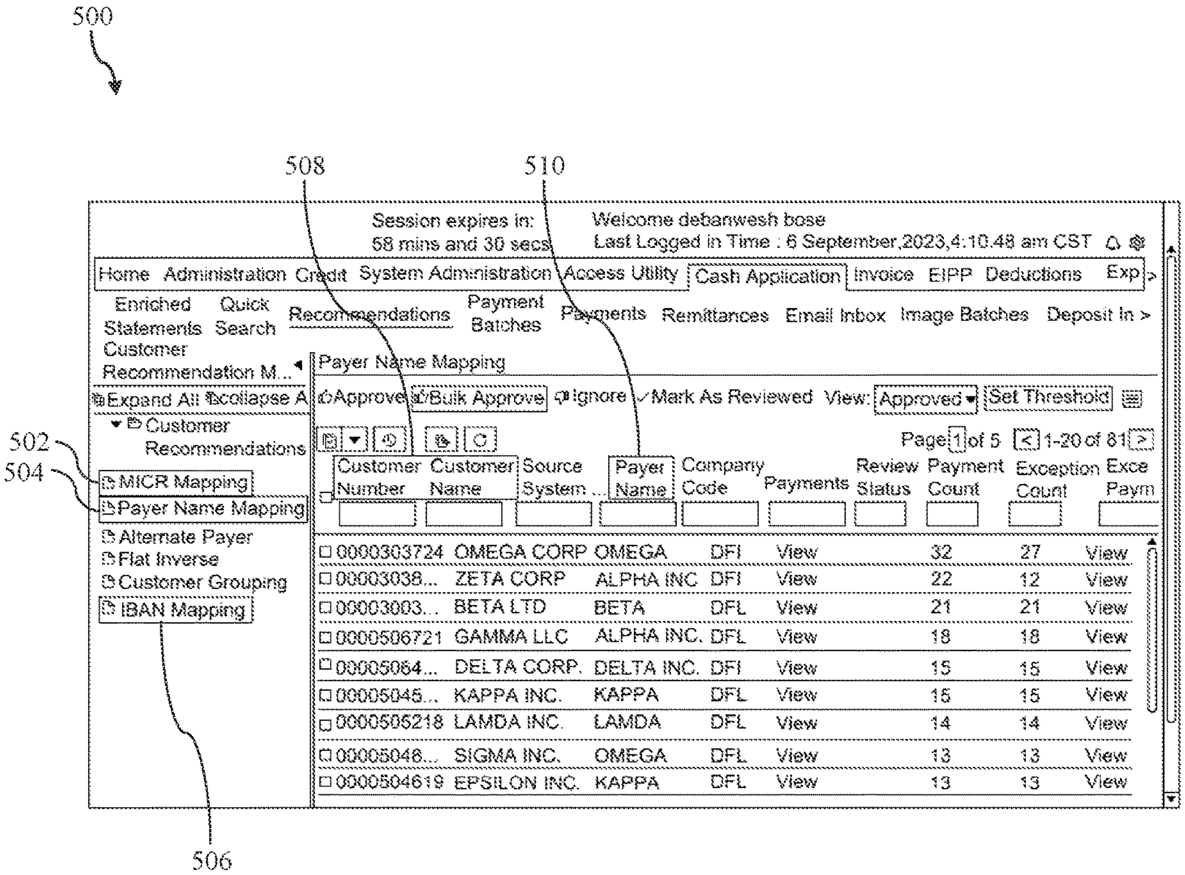
FIG. 5 and FIG. 6 are exemplary graphical representations of the output of the determined one or more unique identifiers associated with the one or more first users, on a user interface associated with one or more electronic devices, in accordance with an embodiment of the present disclosure.
Figure 6:
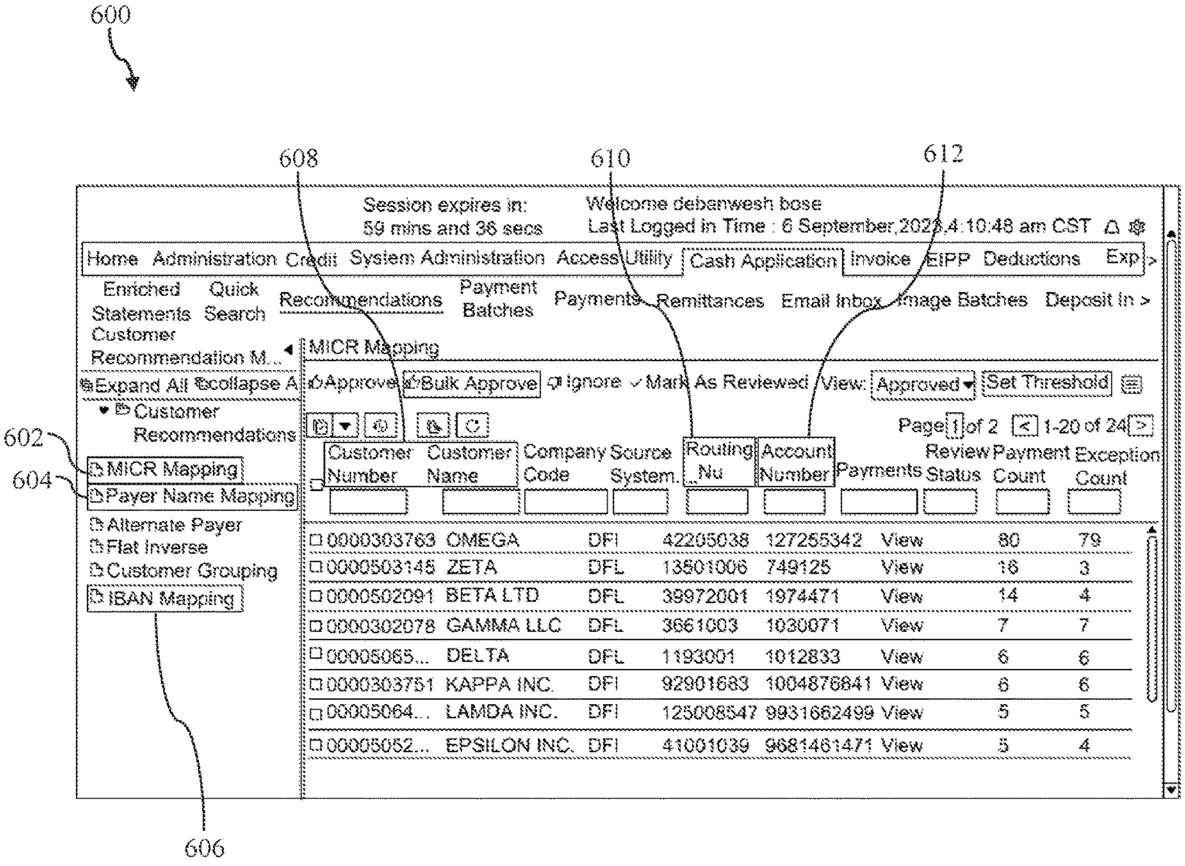

FIG. 5 and FIG. 6 are exemplary graphical representations (500, 600) of the output of the determined one or more unique identifiers associated with the one or more first users, on the user interface associated with one or more electronic devices 102, in accordance with an embodiment of the present disclosure. The graphical representation 500 shows that the graphical user interface has classified tabs for MICR mapping 502, payer alias mapping 504 and IBAN mapping 506. The graphical representation 500 further shows customer identifiers (e.g., the customer name and the customer number) 508 mapped to a payer alias (e.g., payer name) 510.

The graphical representation 600 shows that the graphical user interface has classified tabs for MICR mapping 602, payer alias mapping 604 and IBAN mapping 606. The graphical representation 600 further shows customer identifiers (e.g., the customer name and the customer number) 608 mapped to a MICR Number 610. The customer identifiers 608 can also be mapped to an IBAN Number 612.

Figure 7:
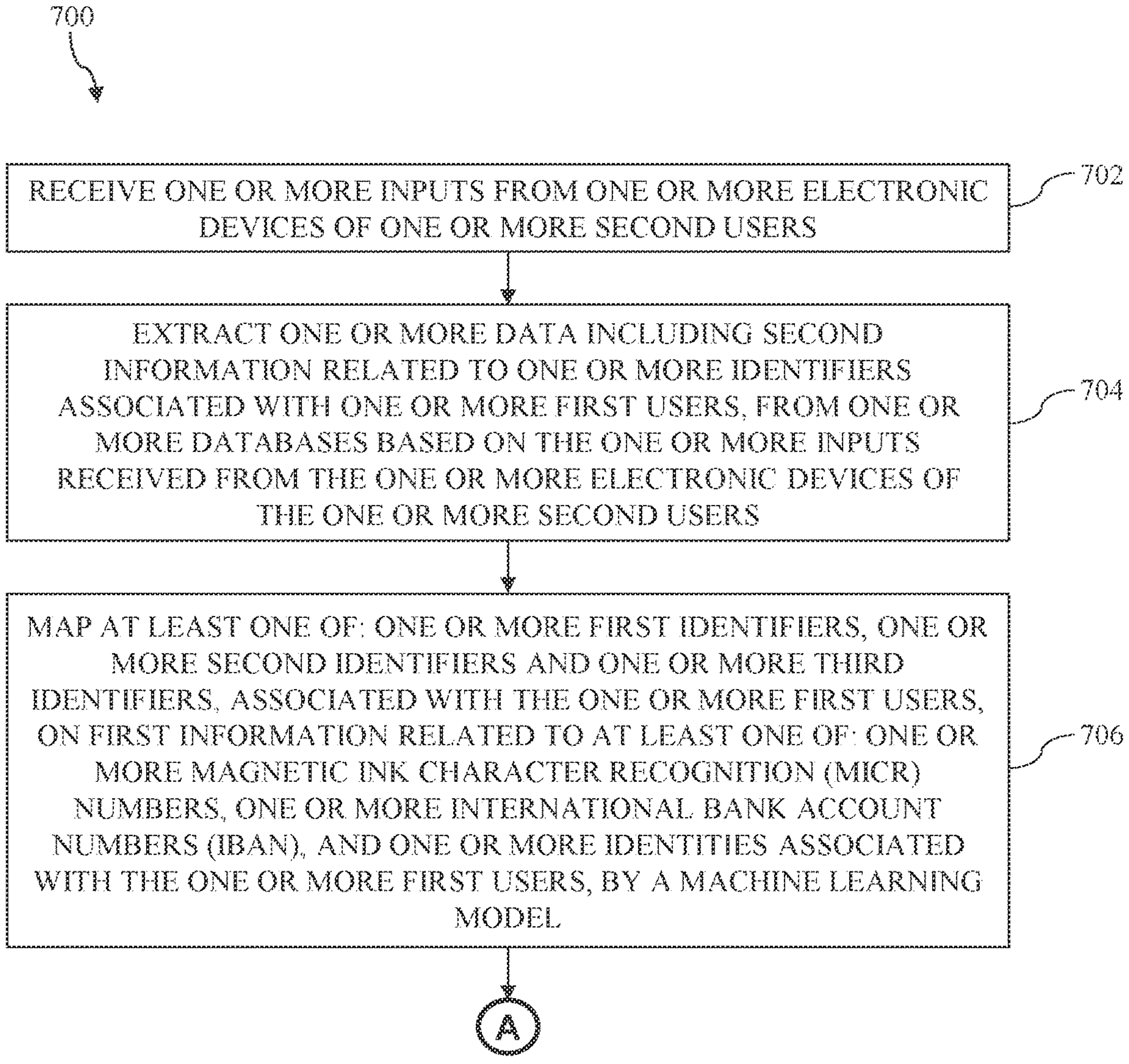
FIG. 7 is a flow chart illustrating a machine-learning based (ML-based) computing method for determining the one or more unique identifiers associated with the one or more first users based on the one or more information associated with the one or more financial transactions, in accordance with an embodiment of the present disclosure.
Figure 7:
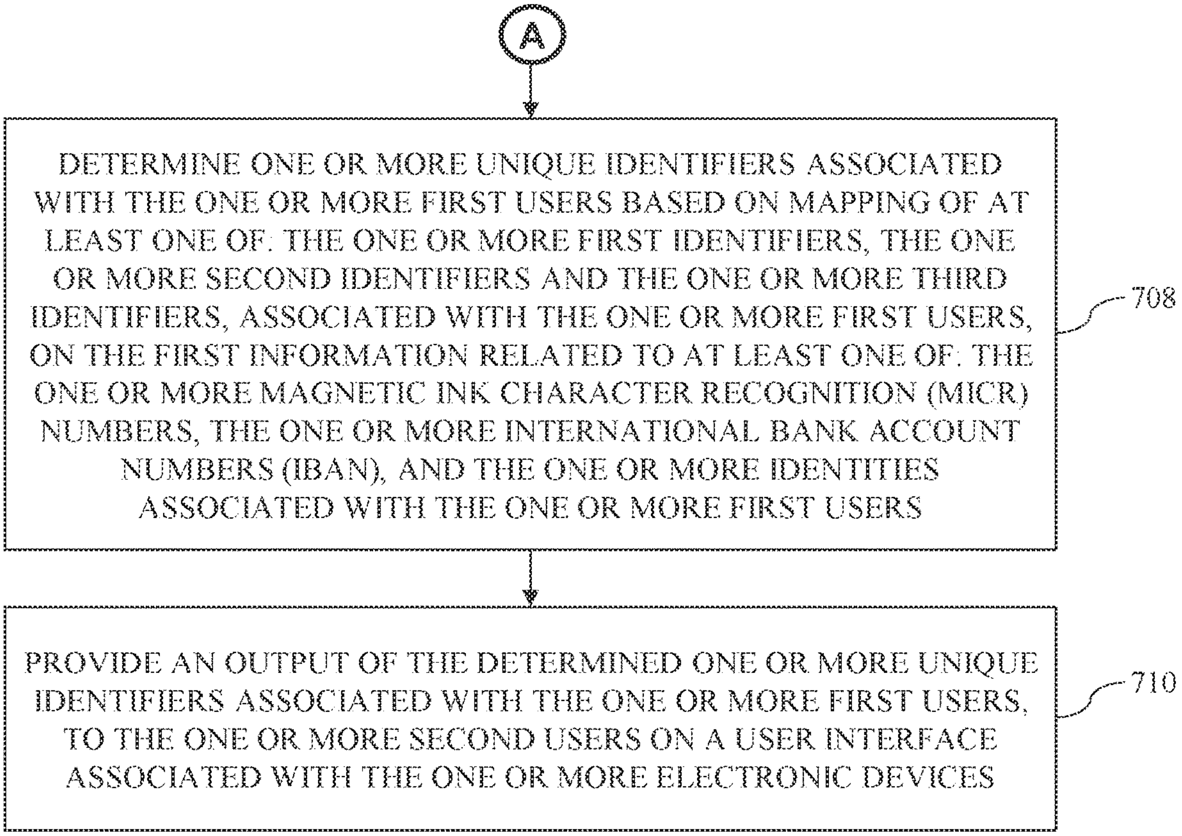

FIG. 7 is a flow chart illustrating a machine-learning based (ML-based) computing method 700 for determining the one or more unique identifiers associated with the one or more first users based on the one or more information associated with the one or more financial transactions, in accordance with an embodiment of the present disclosure.

At step 702, the one or more inputs are received from the one or more electronic devices 102 of the one or more second users. In an embodiment, the one or more inputs include the first information related to at least one of: the one or more magnetic ink character recognition (MICR) numbers, the one or more international bank account numbers (IBAN), and the one or more identities associated with the one or more first users.

At step 704, the one or more data including the second information related to one or more identifiers associated with the one or more first users, are extracted from the one or more databases 108 based on the one or more inputs received from the one or more electronic devices 102 of the one or more second users. In an embodiment, the one or more identifiers associated with the one or more first users include at least one of: the one or more first identifiers, the one or more second identifiers and the one or more third identifiers, associated with the one or more first users.

At step 706, at least one of: the one or more first identifiers, the one or more second identifiers and the one or more third identifiers, associated with the one or more first users, are mapped on the first information related to at least one of: the one or more magnetic ink character recognition (MICR) numbers, the one or more international bank account numbers (IBAN), and the one or more identities associated with the one or more first users, by the machine learning model.

At step 708, the one or more unique identifiers associated with the one or more first users are determined based on mapping of at least one of the one or more first identifiers, the one or more second identifiers and the one or more third identifiers, associated with the one or more first users, on the first information related to at least one of: the one or more magnetic ink character recognition (MICR) numbers, the one or more international bank account numbers (IBAN), and the one or more identities associated with the one or more first users.

At step 710, the output of the determined one or more unique identifiers associated with the one or more first users, is provided to the one or more second users on the user interface associated with the one or more electronic devices 102. In FIG. 7, the circular symbol with "A" written inside is being used as an off-page connector. This is used for indicating that FIG. 7 continues in the next page.

The present invention has the following advantages. The present invention with the ML-based computing system 104 is configured to provide the one or more unique identifiers associated with the one or more first users. The present invention with the ML-based computing system 104 is configured to provide accurate results in determining the customer names based on mapping of the first information related to at least one of: the one or more magnetic ink character recognition (MICR) numbers, the one or more international bank account numbers (IBAN), and the one or more identities (e.g., the payer alias and the payer name) associated with the one or more first users.

Further, the present invention is configured to determine the correct first users (e.g., the customers) for a given payment when the customers have identical MICR or IBAN numbers and even when the payer names lack sufficient distinguishing context. Further, the present invention is configured to minimize the human intervention in reviewing and validating the mapping results.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer-readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid-state memory, magnetic tape, a removable computer diskette, a random-access memory (RAM), a read-only memory (ROM), a rigid magnetic disk and an optical disk. Current examples of optical disks include compact disk-read only memory (CD-ROM), compact disk-read/write (CD-R/W) and DVD.

Input/output (I/O) devices (including but not limited to keyboards, displays, pointing devices, etc.) can be coupled to the ML-based computing system 104 either directly or through intervening I/O controllers. Network adapters may also be coupled to the ML-based computing system 104 to enable the data processing system to become coupled to other data processing systems or remote printers or storage devices through intervening private or public networks. Modems, cable modem and Ethernet cards are just a few of the currently available types of network adapters.

A representative hardware environment for practicing the embodiments may include a hardware configuration of an information handling/ML-based computing system 104 in accordance with the embodiments herein. The ML-based computing system 104 herein comprises at least one processor or central processing unit (CPU). The CPUs are interconnected via system bus 208 to various devices including at least one of: a random-access memory (RAM), read-only memory (ROM), and an input/output (I/O) adapter. The I/O adapter can connect to peripheral devices, including at least one of: disk units and tape drives, or other program storage devices that are readable by the ML-based computing system 104. The ML-based computing system 104 can read the inventive instructions on the program storage devices and follow these instructions to execute the methodology of the embodiments herein.

The ML-based computing system 104 further includes a user interface adapter that connects a keyboard, mouse, speaker, microphone, and/or other user interface devices including a touch screen device (not shown) to the bus to gather user input. Additionally, a communication adapter connects the bus to a data processing network, and a display adapter connects the bus to a display device which may be embodied as an output device including at least one of: a monitor, printer, or transmitter, for example.

A description of an embodiment with several components in communication with each other does not imply that all such components are required. On the contrary, a variety of optional components are described to illustrate the wide variety of possible embodiments of the invention. When a single device or article is described herein, it will be apparent that more than one device/article (whether or not they cooperate) may be used in place of a single device/article. Similarly, where more than one device or article is described herein (whether or not they cooperate), it will be apparent that a single device/article may be used in place of the more than one device or article, or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open-ended in that an item or items following any one of these words is not meant to be an exhaustive listing of such item or items or meant to be limited to only the listed item or items. It must also be noted that as used herein and in the appended claims, the singular forms "a," "an," and "the" include plural references unless the context clearly dictates otherwise.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that are issued on an application based here on. Accordingly, the embodiments of the present invention are intended to be illustrative, but not limiting, of the scope of the invention, which is set forth in the following claims.

What is claimed is:

1. A machine-learning based (ML-based) computing method for determining one or more unique identifiers associated with one or more first users based on one or more information associated with one or more financial transactions, the ML-based computing method comprising:

receiving, by one or more hardware processors, one or more inputs from one or more electronic devices of one or more second users, wherein the one or more inputs comprise first information related to at least one of: one or more magnetic ink character recognition (MICR) numbers, one or more international bank account numbers (IBAN), and one or more identities associated with the one or more first users;

extracting, by the one or more hardware processors, one or more data comprising second information related to one or more identifiers associated with the one or more first users, from one or more databases based on the one or more inputs received from the one or more electronic devices of the one or more second users, wherein the one or more identifiers associated with the one or more first users comprise at least one of: one or more first identifiers, one or more second identifiers and one or more third identifiers, associated with the one or more first users;

dynamically mapping, by the one or more hardware processors, at least one of: the one or more first identifiers, the one or more second identifiers and the one or more third identifiers, associated with the one or more first users, on the first information related to at least one of: the one or more magnetic ink character recognition (MICR) numbers, the one or more international bank account numbers (IBAN), and the one or more identities associated with the one or more first users, by a machine learning model, comprising:

mapping, by the one or more hardware processors, the one or more identifiers associated with the one or more first users by adapting the one or more second users when the one or more first identifiers associated with the one or more first users comprise nil identifiers;

mapping, by the one or more hardware processors, a single identifier associated with the one or more first users on the first information, and the one or more identities associated with the one or more first users, to determine one or more unique identifiers associated with the one or more first users; and mapping, by the one or more hardware processors, the two or more identifiers associated with the one or more first users on the first information and the one or more identities associated with the one or more first users, by the machine learning model, wherein the machine learning model comprises a K-nearest neighbors (KNN) model, configured with one or more hyperparameters; and wherein the one or more hyperparameters comprises a K-value hyperparameter and a distance metric hyperparameter;

determining, by the one or more hardware processors, the one or more unique identifiers associated with the one or more first users based on the mapping of at least one of: the one or more first identifiers, the one or more second identifiers and the one or more third identifiers, associated with the one or more first users, on the first information related to at least one of: the one or more magnetic ink character recognition (MICR) numbers, the one or more international bank account numbers (IBAN), and the one or more identities associated with the one or more first users;

providing, by the one or more hardware processors, an output of the determined one or more unique identifiers associated with the one or more first users, to the one or more second users on a user interface associated with the one or more electronic devices, wherein providing the output comprises:

generating, by the one or more hardware processors, a graphical user interface comprising classified tabs for MICR mapping, payer alias mapping, and IBAN mapping, and displaying within the graphical user interface the determined one or more unique identifiers comprising a customer name and a customer number mapped to a corresponding MICR number, a corresponding IBAN number, or a corresponding payer alias; and receiving, by the one or more hardware processors via the graphical user interface, one or more user interactions from the one or more second users validating the displayed mapping of the determined one or more unique identifiers;

re-training, by the one or more hardware processors, the machine learning model over a plurality of time intervals using the validated mapping as one or more training data;

updating, by the one or more hardware processors, one or more database records associated with the one or more financial transactions by linking the determined one or more unique identifiers to the one or more identities associated with the one or more first users to facilitate reconciliation of the one or more financial transactions, and facilitating, by the one or more hardware processors, routing and settlement of the one or more financial transactions based on the updated one or more database records, by directing funds associated with the one or more financial transactions to one or more accounts corresponding to the determined one or more unique identifiers associated with the one or more first users.

2. The machine-learning based (ML-based) computing method of claim 1, wherein:

the one or more first users comprise at least one of: one or more customers, one or more organizations, one or more corporations, one or more parent companies, one or more subsidiaries, one or more joint ventures, one or more partnerships, one or more governmental bodies, one or more associations, and one or more legal entities; and the one or more second users comprises at least one of: one or more data analysts, one or more business analysts, one or more cash analysts, one or more financial analysts, one or more collection analysts, one or more debt collectors, and one or more professionals associated with cash and collection management.

3. The machine-learning based (ML-based) computing method of claim 1, wherein:

the one or more first identifiers associated with the one or more first users comprises the nil identifiers associated with the one or more first users, extracted from the one or more databases based on the one or more inputs received from the one or more electronic devices of the one or more second users;

the one or more second identifiers associated with the one or more first users comprise the single identifier associated with the one or more first users, extracted from the one or more databases based on the one or more inputs received from the one or more electronic devices of the one or more second users; and the one or more third identifiers associated with the one or more first users comprise two or more identifiers associated with the one or more first users, extracted from the one or more databases based on the one or more inputs received from the one or more electronic devices of the one or more second users.

4. The machine-learning based (ML-based) computing method of claim 1, further comprising training, by the one or more hardware processors, the machine learning model, by:

obtaining, by the one or more hardware processors, one or more labelled datasets from the one or more databases, wherein the one or more labelled datasets comprise at least one of: one or more first historical data associated with the one or more first users and one or more second historical data associated with one or more payments;

setting, by the one or more hardware processors, the one or more hyperparameters to identify one or more K-nearest neighbors associated with the one or more labelled datasets;

segmenting, by the one or more hardware processors, the one or more labelled datasets into at least one of: one or more training datasets and one or more validation datasets, wherein the one or more training datasets comprise one or more third historical data associated with the one or more first users and one or more fourth historical data associated with the one or more payments, and wherein the one or more validation datasets comprise one or more fifth historical data associated with the one or more first users and one or more sixth historical data associated with the one or more payments; and training, by the one or more hardware processors, the machine learning model to correlate one or more first feature vectors associated with the one or more fourth historical data, with the one or more third historical data associated with the one or more first users, by:

computing, by the one or more hardware processors, one or more distances between one or more data points, wherein the machine learning model is configured to compute the one or more distances from each data point of the one or more data points to the one or more data points in the one or more training datasets, by the distance metric hyperparameter;

identifying, by the one or more hardware processors, the one or more K-nearest neighbors based on the one or more distances computed for each data point of the one or more data points in the one or more training datasets; and upon identifying the one or more K-nearest neighbors, determining, by the one or more hardware processors, one or more classes for each data point of the one or more data points based on at least one of: a majority voting process and a weighted voting process;

wherein the one or more classes recurrently determined among the one or more K-nearest neighbors, are assigned as the one or more classes determined for each data point of the one or more data points, and wherein the one or more classes are determined by assigning one or more weights to the one or more K-nearest neighbors based on the one or more distances.

5. The machine-learning based (ML-based) computing method of claim 4, further comprising validating, by the one or more hardware processors, the machine learning model based on the one or more validation datasets, wherein validating the machine learning model comprises:

applying, by the one or more hardware processors, the trained machine learning model on the one or more validation datasets to determine the one or more classes for each data point of the one or more data points; and determining, by the one or more hardware processors, whether the trained machine learning model correlates one or more second feature vectors associated with the one or more sixth historical data, with the one or more fifth historical data associated with the one or more first users.

6. The machine-learning based (ML-based) computing method of claim 5, further comprising adjusting, by the one or more hardware processors, the one or more hyperparameters to fine-tune the machine learning model based on the one or more results of validation of the machine learning model.

7. The machine-learning based (ML-based) computing method of claim 4, wherein re-training of the machine learning model over the plurality of time intervals, comprises:

receiving, by the one or more hardware processors, the one or more training data comprising at least one of: one or more seventh historical data associated with the one or more first users and one or more eighth historical data associated with the one or more payments;

adding, by the one or more hardware processors, the one or more training data and the one or more additional training data with the one or more training datasets to generate one or more updated training datasets;

re-training, by the one or more hardware processors, the machine learning model to correlate the one or more first feature vectors associated with the one or more fourth historical data, with the one or more third historical data associated with the one or more first users; and executing, by the one or more hardware processors, the re-trained machine learning model in a user identifier mapping subsystem to determine the one or more unique identifiers associated with the one or more first users.

8. A machine learning based (ML-based) computing system for determining one or more unique identifiers associated with one or more first users based on one or more information associated with one or more financial transactions, the ML-based computing system comprising:

one or more hardware processors;

a memory coupled to the one or more hardware processors, wherein the memory comprises a plurality of subsystems in form of programmable instructions executable by the one or more hardware processors, and wherein the plurality of subsystems comprises:

a data receiving subsystem configured to receive one or more inputs from one or more electronic devices of one or more second users, wherein the one or more inputs comprise first information related to at least one of: one or more magnetic ink character recognition (MICR) numbers, one or more international bank account numbers (IBAN), and one or more identities associated with the one or more first users;

a data extraction subsystem configured to extract one or more data comprising second information related to one or more identifiers associated with the one or more first users, from one or more databases based on the one or more inputs received from the one or more electronic devices of the one or more second users, wherein the one or more identifiers associated with the one or more first users comprise at least one of: one or more first identifiers, one or more second identifiers and one or more third identifiers, associated with the one or more first users;

a user identifier mapping subsystem configured to:

dynamically map at least one of: the one or more first identifiers, the one or more second identifiers and the one or more third identifiers, associated with the one or more first users, on the first information related to at least one of: the one or more magnetic ink character recognition (MICR) numbers, the one or more international bank account numbers (IBAN), and the one or more identities associated with the one or more first users, by a machine learning model, wherein in the mapping, the user identifier mapping subsystem is configured to:

map the one or more identifiers associated with the one or more first users by adapting the one or more second users when the one or more first identifiers associated with the one or more first users comprise nil identifiers;

map a single identifier associated with the one or more first users on the first information, and the one or more identities associated with the one or more first users, to determine one or more unique identifiers associated with the one or more first users; and map the two or more identifiers associated with the one or more first users on the first information, and the one or more identities associated with the one or more first users, by the machine learning model, wherein the machine learning model comprises a K-nearest neighbors (KNN) model, configured with one or more hyperparameters; and wherein the one or more hyperparameters comprises a K-value hyperparameter and a distance metric hyperparameter;

determine the one or more unique identifiers associated with the one or more first users based on mapping of at least one of: the one or more first identifiers, the one or more second identifiers and the one or more third identifiers, associated with the one or more first users, on the first information related to at least one of: the one or more magnetic ink character recognition (MICR) numbers, the one or more international bank account numbers (IBAN), and the one or more identities associated with the one or more first users;

an output subsystem configured to:

provide an output of the determined one or more unique identifiers associated with the one or more first users, to the one or more second users on a user interface associated with the one or more electronic devices, wherein in providing the output, the output subsystem is configured to:

generate a graphical user interface comprising classified tabs for MICR mapping, payer alias mapping, and IBAN mapping, and displaying within the graphical user interface the determined one or more unique identifiers comprising a customer name and a customer number mapped to a corresponding MICR number, a corresponding IBAN number, or a corresponding payer alias; and receive via the graphical user interface, one or more user interactions from the one or more second users validating the displayed mapping of the determined one or more unique identifiers; and a training subsystem configured to re-train the machine learning model over a plurality of time intervals based on one or more training data;

update one or more database records associated with the one or more financial transactions by linking the determined one or more unique identifiers to the one or more identities associated with the one or more first users to facilitate reconciliation of the one or more financial transactions; and facilitate routing and settlement of the one or more financial transactions based on the updated one or more database records, by directing funds associated with the one or more financial transactions to one or more accounts corresponding to the determined one or more unique identifiers associated with the one or more first users.

9. The machine learning based (ML-based) computing system of claim 8, wherein:

the one or more first users comprise at least one of: one or more customers, one or more organizations, one or more corporations, one or more parent companies, one or more subsidiaries, one or more joint ventures, one or more partnerships, one or more governmental bodies, one or more associations, and one or more legal entities; and the one or more second users comprises at least one of: one or more data analysts, one or more business analysts, one or more cash analysts, one or more financial analysts, one or more collection analysts, one or more debt collectors, and one or more professionals associated with cash and collection management.

10. The machine-learning based (ML-based) computing system of claim 8, wherein:

the one or more first identifiers associated with the one or more first users comprises the nil identifiers associated with the one or more first users, extracted from the one or more databases based on the one or more inputs received from the one or more electronic devices of the one or more second users;

the one or more second identifiers associated with the one or more first users comprise the single identifier associated with the one or more first users, extracted from the one or more databases based on the one or more inputs received from the one or more electronic devices of the one or more second users; and the one or more third identifiers associated with the one or more first users comprise two or more identifiers associated with the one or more first users, extracted from the one or more databases based on the one or more inputs received from the one or more electronic devices of the one or more second users.

11. The machine-learning based (ML-based) computing system of claim 8, wherein the training subsystem is configured to train the machine learning model, wherein in training the machine learning model, the training subsystem is configured to:

obtain one or more labelled datasets from the one or more databases, wherein the one or more labelled datasets comprise at least one of: one or more first historical data associated with the one or more first users and one or more second historical data associated with one or more payments;

set the one or more hyperparameters to identify one or more K-nearest neighbors associated with the one or more labelled datasets;

segment the one or more labelled datasets into at least one of: one or more training datasets and one or more validation datasets, wherein the one or more training datasets comprise one or more third historical data associated with the one or more first users and one or more fourth historical data associated with the one or more payments, and wherein the one or more validation datasets comprise one or more fifth historical data associated with the one or more first users and one or more sixth historical data associated with the one or more payments; and train the machine learning model to correlate one or more first feature vectors associated with the one or more fourth historical data, with the one or more third historical data associated with the one or more first users, by:

computing one or more distances between one or more data points, wherein the machine learning model is configured to compute the one or more distances from each data point of the one or more data points to the one or more data points in the one or more training datasets, by the distance metric hyperparameter;

identifying the one or more K-nearest neighbors based on the one or more distances computed for each data point of the one or more data points in the one or more training datasets; and upon identifying the one or more K-nearest neighbors, determining one or more classes for each data point of the one or more data points based on at least one of: a majority voting process and a weighted voting process;

wherein the one or more classes recurrently determined among the one or more K-nearest neighbors, are assigned as the one or more classes determined for each data point of the one or more data points, and wherein the one or more classes are determined by assigning one or more weights to the one or more K-nearest neighbors based on the one or more distances.

12. The machine-learning based (ML-based) computing system of claim 11, wherein the training subsystem is further configured to validate the machine learning model based on the one or more validation datasets, wherein in validating the machine learning model, the training subsystem is configured to:

apply the trained machine learning model on the one or more validation datasets to determine the one or more classes for each data point of the one or more data points; and determine whether the trained machine learning model correlates one or more second feature vectors associated with the one or more sixth historical data, with the one or more fifth historical data associated with the one or more first users.

13. The machine-learning based (ML-based) computing system of claim 12, wherein the training subsystem is further configured to adjust the one or more hyperparameters to fine-tune the machine learning model based on the one or more results of validation of the machine learning model.

14. The machine-learning based (ML-based) computing system of claim 11, wherein in re-training the machine learning model over the plurality of time intervals, the training subsystem is configured to:

receive the one or more training data comprising at least one of: one or more seventh historical data associated with the one or more first users and one or more eighth historical data associated with the one or more payments;

add the one or more training data with the one or more training datasets to generate one or more updated training datasets;

re-train the machine learning model to correlate the one or more first feature vectors associated with the one or more fourth historical data, with the one or more third historical data associated with the one or more first users; and execute the re-trained machine learning model in a user identifier mapping subsystem to determine the one or more unique identifiers associated with the one or more first users.

15. A non-transitory computer-readable storage medium having instructions stored therein that when executed by a hardware processor, cause the processor to execute operations of:

receiving one or more inputs from one or more electronic devices of one or more second users, wherein the one or more inputs comprise first information related to at least one of: one or more magnetic ink character recognition (MICR) numbers, one or more international bank account numbers (IBAN), and one or more identities associated with the one or more first users;

extracting one or more data comprising second information related to one or more identifiers associated with the one or more first users, from one or more databases based on the one or more inputs received from the one or more electronic devices of the one or more second users, wherein the one or more identifiers associated with the one or more first users comprise at least one of: one or more first identifiers, one or more second identifiers and one or more third identifiers, associated with the one or more first users;

dynamically mapping at least one of: the one or more first identifiers, the one or more second identifiers and the one or more third identifiers, associated with the one or more first users, on the first information related to at least one of: the one or more magnetic ink character recognition (MICR) numbers, the one or more international bank account numbers (IBAN), and the one or more identities associated with the one or more first users, by a machine learning model, comprising:

mapping the one or more identifiers associated with the one or more first users by adapting the one or more second users when the one or more first identifiers associated with the one or more first users comprise nil identifiers;

mapping a single identifier associated with the one or more first users on the first information, and the one or more identities associated with the one or more first users, to determine one or more unique identifiers associated with the one or more first users; and mapping the two or more identifiers associated with the one or more first users on the first information, and the one or more identities associated with the one or more first users, by the machine learning model, wherein the machine learning model comprises a K-nearest neighbors (KNN) model, configured with one or more hyperparameters; and wherein the one or more hyperparameters comprises a K-value hyperparameter and a distance metric hyperparameter;

determining the one or more unique identifiers associated with the one or more first users based on mapping of at least one of: the one or more first identifiers, the one or more second identifiers and the one or more third identifiers, associated with the one or more first users, on the first information related to at least one of: the one or more magnetic ink character recognition (MICR) numbers, the one or more international bank account numbers (IBAN), and the one or more identities associated with the one or more first users;

providing an output of the determined one or more unique identifiers associated with the one or more first users, to the one or more second users on a user interface associated with the one or more electronic devices, wherein providing the output comprises:

generating a graphical user interface comprising classified tabs for MICR mapping, payer alias mapping, and IBAN mapping, and displaying within the graphical user interface the determined one or more unique identifiers comprising a customer name and a customer number mapped to a corresponding MICR number, a corresponding IBAN number, or a corresponding payer alias; and receiving one or more user interactions from the one or more second users validating the displayed mapping of the determined one or more unique identifiers;

re-training the machine learning model over a plurality of time intervals using the validated mapping as one or more training data;

updating one or more database records associated with the one or more financial transactions by linking the determined one or more unique identifiers to the one or more identities associated with the one or more first users to facilitate reconciliation of the one or more financial transactions, and facilitating routing and settlement of the one or more financial transactions based on the updated one or more database records, by directing funds associated with the one or more financial transactions to one or more accounts corresponding to the determined one or more unique identifiers associated with the one or more first users.

16. The non-transitory computer-readable storage medium of claim 15, further comprising training the machine learning model, by:

obtaining one or more labelled datasets from the one or more databases, wherein the one or more labelled datasets comprise at least one of: one or more first historical data associated with the one or more first users and one or more second historical data associated with one or more payments;

setting the one or more hyperparameters to identify one or more K-nearest neighbors associated with the one or more labelled datasets;

segmenting the one or more labelled datasets into at least one of: one or more training datasets and one or more validation datasets, wherein the one or more training datasets comprise one or more third historical data associated with the one or more first users and one or more fourth historical data associated with the one or more payments, and wherein the one or more validation datasets comprise one or more fifth historical data associated with the one or more first users and one or more sixth historical data associated with the one or more payments; and training the machine learning model to correlate one or more first feature vectors associated with the one or more fourth historical data, with the one or more third historical data associated with the one or more first users, by:

computing one or more distances between one or more data points, wherein the machine learning model is configured to compute the one or more distances from each data point of the one or more data points to the one or more data points in the one or more training datasets, by the distance metric hyperparameter;

identifying the one or more K-nearest neighbors based on the one or more distances computed for each data point of the one or more data points in the one or more training datasets; and upon identifying the one or more K-nearest neighbors, determining one or more classes for each data point of the one or more data points based on at least one of: a majority voting process and a weighted voting process;

wherein the one or more classes recurrently determined among the one or more K-nearest neighbors, are assigned as the one or more classes determined for each data point of the one or more data points, and wherein the one or more classes are determined by assigning one or more weights to the one or more K-nearest neighbors based on the one or more distances.

17. The non-transitory computer-readable storage medium of claim 16, further comprising validating the machine learning model based on the one or more validation datasets, wherein validating the machine learning model comprises:

applying the trained machine learning model on the one or more validation datasets to determine the one or more classes for each data point of the one or more data points; and determining whether the trained machine learning model correlates one or more second feature vectors associated with the one or more sixth historical data, with the one or more fifth historical data associated with the one or more first users.

* * * * *